US010944529B2

(12) United States Patent
Wang et al.

(10) Patent No.: US 10,944,529 B2
(45) Date of Patent: Mar. 9, 2021

(54) DATA TRANSMISSION METHOD AND APPARATUS

(71) Applicant: Huawei Technologies Co., Ltd., Guangdong (CN)

(72) Inventors: Ting Wang, Shanghai (CN); Yuanjie Li, Shanghai (CN); Feng Qian, Shanghai (CN); Qunfang Lou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 6 days.

(21) Appl. No.: 16/403,150

(22) Filed: May 3, 2019

(65) Prior Publication Data
US 2019/0260545 A1    Aug. 22, 2019

Related U.S. Application Data

(63) Continuation of application No. PCT/CN2017/109424, filed on Nov. 3, 2017.

(30) Foreign Application Priority Data

Nov. 4, 2016 (CN) .......................... 201610962416.0

(51) Int. Cl.
*H04L 5/00* (2006.01)
*H04W 72/04* (2009.01)
*H04W 72/12* (2009.01)

(52) U.S. Cl.
CPC .......... *H04L 5/0051* (2013.01); *H04L 5/0055* (2013.01); *H04W 72/042* (2013.01); *H04W 72/12* (2013.01)

(58) Field of Classification Search
CPC ... H04L 5/0051; H04L 5/0055; H04L 5/0023; H04L 5/005; H04L 5/0094; H04W 72/12;
(Continued)

(56) References Cited

U.S. PATENT DOCUMENTS 8,902,842 B1 * 12/2014 Gomadam .............. H04L 5/005
370/329
2010/0323720 A1 * 12/2010 Jen ........................ H04W 64/00
455/456.1

(Continued)

FOREIGN PATENT DOCUMENTS

CN    102223722 A    10/2011
CN    102348163 A    2/2012
(Continued)

OTHER PUBLICATIONS

Alcatel-Lucent, et al., "Remaining issues of Downlink Control Signalling for CoMP", 3GPP TSG RAN WG1 Meeting #70, R1-123142, Qingdao, China, Aug. 13-17, 2012, 4 pages.

(Continued)

*Primary Examiner* — Ayaz R Sheikh
*Assistant Examiner* — Faiyazkhan Ghafoerkhan
(74) *Attorney, Agent, or Firm* — Slater Matsil, LLP

(57) ABSTRACT

This application provides a data transmission method, to indicate resource configuration statuses of at least two groups of CRSs to a terminal device, so that the terminal device can correctly receive data, and improve data receiving performance. The method includes: receiving, by a terminal device, indication information sent by a network device, where the indication information is used to determine resources occupied by N groups of cell-specific reference signals CRSs, and N is a natural number greater than or equal to 2; and determining, by the terminal device based on the indication information, the resources that are occupied by the N groups of CRSs, and receiving data based on the resources that are occupied by the N groups of CRSs.

15 Claims, 7 Drawing Sheets

(58) Field of Classification Search
CPC ........... H04W 72/042; H04W 72/1221; H04W 72/1257; H04W 72/1263; H04W 72/1278; H04W 72/044; H04W 72/1273; H04W 72/1289
See application file for complete search history.

(56) References Cited

U.S. PATENT DOCUMENTS

| | | | |
|---|---|---|---|
| 2013/0094442 A1* | 4/2013 | Kim | H04L 5/0094 370/328 |
| 2015/0215906 A1 | 7/2015 | Park et al. | |
| 2016/0192415 A1* | 6/2016 | Davydov | H04B 7/0626 370/329 |
| 2016/0248561 A1* | 8/2016 | Davydov | H04B 7/0413 |

FOREIGN PATENT DOCUMENTS

| | | |
|---|---|---|
| CN | 103036640 A | 4/2013 |
| CN | 103874207 A | 6/2014 |
| CN | 103959730 A | 7/2014 |
| JP | 2014532350 A | 12/2014 |
| JP | 2015534784 A | 12/2015 |
| WO | 2013048216 A1 | 4/2013 |

OTHER PUBLICATIONS

3GPP TS 36.211 V14.0.0 (Sep. 2016); 3rd Generation Partnership Project; Technical Specification Group Radio Access Network; Evolved Universal Terrestrial Radio Access (E-UTRA); Physical channels and modulation (Release 14); total 170 pages.
3GPP TS 36.212 V14.0.0 (Sep. 2016); 3rd Generation Partnership Project; Technical Specification Group Radio Access Network; Evolved Universal Terrestrial Radio Access (E-UTRA); Multiplexing and channel coding (Release 14); total 148 pages.
3GPP TS 36.213 V14.0.0 (Sep. 2016); 3rd Generation Partnership Project; Technical Specification Group Radio Access Network; Evolved Universal Terrestrial Radio Access (E-UTRA); Physical layer procedures (Release 14); total 406 pages.
Nokia, et al., "Discussion and Preliminary Simulation Results of NCJT Case 1 of FeCoMP", 3GPP TSG-RAN WG1 Meeting #86bis, R1-1608933, Lisbon, Portugal, Oct. 10-14, 2016, 7 pages.

* cited by examiner

DATA TRANSMISSION METHOD AND APPARATUS

CROSS-REFERENCE TO RELATED APPLICATIONS

This application is a continuation of International Patent Application No. PCT/CN2017/109424, filed on Nov. 3, 2017, which claims priority to Chinese Patent Application No. 201610962416.0, filed on Nov. 4, 2016. The disclosures of the aforementioned applications are hereby incorporated by reference in their entireties.

TECHNICAL FIELD

This application relates to the communications field, and more specifically, to a data transmission method and apparatus.

BACKGROUND

In a 3rd Generation Partnership Project (3GPP) Long Term Evolution Advanced (LTE-A), in a coordinated multipoint (CoMP) technology, a plurality of network elements in separate geographical locations coordinate to communicate with user equipment (UE), to reduce interference of UE that is located on an edge of a cell, and improve a cell edge throughput, thereby improving reliability.

When sending data to a terminal device, a plurality of network devices (for example, which are recorded as a network device A and a network device B) separately send a cell-specific reference signal (CRS) to the terminal device for channel estimation. In the prior art, when sending downlink control information (DCI) to the terminal device, a serving network device (for example, the network device A) adds, to the DCI, CRS configuration information that is used to indicate a serving cell (namely, a cell corresponding to the serving network device), so that the terminal device receives data based on the CRS configuration information.

However, when the plurality of network devices send data to the terminal device at the same time, each network device sends a CRS. The terminal device learns of only a time-frequency resource that is occupied by a CRS of the serving cell, but a time-frequency resource (for example, which is recorded as a time-frequency resource A) that is occupied by a CRS of a coordinated cell (for example, a cell corresponding to the network device B) may be different from the time-frequency resource (for example, which is recorded as a time-frequency resource B) that is occupied by the CRS of the serving cell. However, the terminal device does not know that the network device sends the CRS in the time-frequency resource A, and still receives data in the time-frequency resource B. This causes a data decoding error, and reduces data receiving performance.

SUMMARY

This application provides a data transmission method and apparatus, to indicate resource configuration statuses of at least two groups of CRSs to a terminal device, so that the terminal device can correctly receive data, and improve data receiving performance.

According to a first aspect, a data transmission method is provided, including:

receiving, by a terminal device, indication information sent by a network device, where the indication information is used to determine resources occupied by N groups of cell-specific reference signals CRSs, and N is a natural number greater than or equal to 2; and determining, by the terminal device based on the indication information, the resources that are occupied by the N groups of CRSs, and receiving, based on the resources that are occupied by the N groups of CRSs, data that is sent by at least one network device.

The network device may be any one of the at least one network device, or may not be one of the at least one network device. This is not specifically limited in this application.

It should be noted that the indication information may be used to directly or indirectly indicate information about a quantity of CRS antenna ports and a CRS frequency offset. In the resources that are occupied by the N groups of CRSs, quantities of CRS antenna ports corresponding to any two groups of CRSs are different from each other, or CRS frequency offsets corresponding to any two groups of CRSs are different from each other, or both quantities of CRS antenna ports and CRS frequency offsets that are corresponding to any two groups of CRSs are different from each other.

Therefore, in the data transmission method of this embodiment of this application, the indication information is sent to the terminal device, so that the terminal device determines the resources that are occupied by the N groups of CRSs. Therefore, the terminal device may consider CRS resources of all network devices when receiving data, to correctly receive data, and improve receiving performance.

Further, the indication information is corresponding to at least one of the following items: a codeword corresponding to the data, a layer to which the codeword is mapped, or an antenna port (namely, a data antenna port) to which the codeword is mapped.

Optionally, the receiving, by a terminal device, indication information sent by a network device includes:

receiving, by the terminal device, downlink control information DCI that is sent by the network device, where the DCI includes the indication information.

Therefore, after each field of DCI in an existing protocol is modified or extended, the indication information is borne in the DCI, so that the terminal device may determine, based on the received DCI in a physical downlink control channel (PDCCH), the resources that are occupied by the N groups of CRSs, to correctly receive data in a physical downlink shared channel (PDSCH), and improve data receiving performance.

With reference to the first aspect, in a first possible implementation of the first aspect, the indication information includes first indication information that is used to indicate quantities of antenna ports and frequency offsets of the N groups of CRSs; and the receiving, by a terminal device, indication information sent by a network device includes:

receiving, by the terminal device, the first indication information sent by the network device.

Therefore, the first indication information that is used to directly indicate a quantity of CRS antenna ports and a frequency offset is sent to the terminal device, so that the terminal device may directly determine, based on the first indication information, the resources that are occupied by the N groups of CRSs, to correctly receive data, and improve receiving performance.

In a possible design, the first indication information is indexes of N first physical downlink shared channel resource element mapping and quasi-co-location indicators PQIs corresponding to the N groups of CRSs, and each first PQI includes information about a quantity of antenna ports and a frequency offset of one group of CRSs; and the receiving, by the terminal device, the first indication information sent by the network device includes:

receiving, by the terminal device, the indexes of the N first PQIs that are sent by the network device; and the determining, by the terminal device based on the indication information, the resources that are occupied by the N groups of CRSs includes:

determining, by the terminal device based on a first mapping relationship and the indexes of the N first PQIs, the resources that are occupied by the N groups of CRSs, where the first mapping relationship is used to indicate a mapping relationship between indexes of a plurality of first PQIs and a plurality of higher layer parameter groups.

Optionally, the index of the first PQI is used to indicate a physical downlink shared channel resource element mapping and quasi-co-location configuration (PDSCH-RE-mapping-QCL-Config) parameter set currently used by the terminal device for data transmission.

Optionally, the PDSCH-RE-mapping-QCL-Config parameter set is carried in radio resource control (RRC) signaling.

Optionally, the first PQI is a higher layer parameter.

In a possible design, the first indication information is indexes of S second PQIs corresponding to the N groups of CRSs, and each second PQI includes information about a quantity of antenna ports and a frequency offset of at least one group of CRSs, where S∈[1, N), and S is a natural number; and the receiving, by the terminal device, the first indication information sent by the network device includes:

receiving, by the terminal device, the indexes of the S second PQIs that are sent by the network device; and the determining, by the terminal device based on the indication information, the resources that are occupied by the N groups of CRSs includes:

determining, by the terminal device based on a second mapping relationship and the indexes of the S second PQIs, the resources that are occupied by the N groups of CRSs, where the second mapping relationship is used to indicate a mapping relationship between indexes of a plurality of second PQIs and a plurality of higher layer parameter group sets.

Optionally, the first indication information is an index of one second PQI, and the second PQI includes information about the quantities of antenna ports and the frequency offsets of the N groups of CRSs.

Optionally, the index of the second PQI is used to indicate a PDSCH-RE-mapping-QCL-Config parameter set currently used by the terminal device for data transmission.

Optionally, the PDSCH-RE-mapping-QCL-Config parameter set is carried in RRC signaling.

Optionally, the second PQI is a higher layer parameter.

In a possible design, the first indication information includes N indexes of quantities of CRS antenna ports corresponding to the N groups of CRSs and N indexes of CRS frequency offsets corresponding to the N groups of CRSs, the quantity of CRS antenna ports indicates a quantity of antenna ports through which CRSs are sent, and the CRS frequency offset indicates a location of a resource element RE to which the CRS is mapped in a frequency domain resource; and the receiving, by the terminal device, the first indication information sent by the network device includes:

receiving, by the terminal device, the N indexes of the quantities of CRS antenna ports and the N indexes of the CRS frequency offsets that are sent by the network device; and the determining, by the terminal device based on the indication information, the resources that are occupied by the N groups of CRSs includes:

determining, by the terminal device based on a third mapping relationship, a fourth mapping relationship, the N indexes of the quantities of CRS antenna ports, and the N indexes of the CRS frequency offsets, the resources that are occupied by the N groups of CRSs, where the third mapping relationship is used to indicate a mapping relationship between a plurality of indexes and a plurality of quantities of CRS antenna ports, and the fourth mapping relationship is used to indicate a mapping relationship between a plurality of indexes and a plurality of CRS frequency offsets.

In a possible design, the first indication information is N indexes of quantities of CRS antenna ports and frequency offsets that are corresponding to the N groups of CRSs, and the quantity of CRS antenna ports and the frequency offset indicate a quantity of antenna ports through which CRSs are sent and a location of an RE to which the CRS is mapped in a frequency domain resource; and the receiving, by the terminal device, the first indication information sent by the network device includes:

receiving, by the terminal device, the N indexes of the quantities of CRS antenna ports and the frequency offsets that are sent by the network device; and the determining, by the terminal device based on the indication information, the resources that are occupied by the N groups of CRSs includes:

determining, by the terminal device based on a fifth mapping relationship and the N indexes of the quantities of CRS antenna ports and the frequency offsets, the resources that are occupied by the N groups of CRSs, where the fifth mapping relationship is used to indicate a mapping relationship between a plurality of indexes and a plurality of pieces of information about a quantity of CRS antenna ports and a frequency offset.

In a possible design, the first indication information is an index of configuration information, the configuration information indicates an index of a quantity of antenna ports and a frequency offset of each of the N groups of CRSs, and the quantity of CRS antenna ports and the frequency offset indicate a quantity of antenna ports through which CRSs are sent and a location of an RE to which the CRS is mapped in a frequency domain resource; and the receiving, by the terminal device, the first indication information sent by the network device includes:

receiving, by the terminal device, the index of the configuration information that is sent by the network device; and the determining, by the terminal device based on the indication information, the resources that are occupied by the N groups of CRSs includes:

determining, by the terminal device based on a sixth mapping relationship and the index of the configuration information, the resources that are occupied by the N groups of CRSs, where the sixth mapping relationship is used to indicate a mapping relationship between a plurality of indexes of configuration information and indexes of quantities of antenna ports and frequency offsets of a plurality of groups of CRSs, or the sixth mapping relationship is used to indicate a mapping relationship between a plurality of indexes of configuration information and indexes of a plurality of groups of PQIs.

With reference to the first aspect, in a second possible implementation of the first aspect, the indication information includes an index of a cell identifier of at least one cell and information about a quantity of CRS antenna ports of the at least one cell, the cell identifier is used to determine a CRS frequency offset, and the CRS frequency offset indicates a location of an RE to which the CRS is mapped in a frequency domain resource; and the receiving, by a terminal device, indication information sent by a network device includes:

receiving, by the terminal device, the index of the cell identifier of the at least one cell and the information about the quantity of CRS antenna ports of the at least one cell that are sent by the network device; and the determining, by the terminal device based on the indication information, the resources that are occupied by the N groups of CRSs includes:

determining, by the terminal device based on a seventh mapping relationship, the index of the at least one cell identifier, and the information about the quantity of CRS antenna ports of the at least one cell, the resources that are occupied by the N groups of CRSs, where the seventh mapping relationship is used to indicate a mapping relationship between indexes of a plurality of cell identifiers and cell identifiers of a plurality of cells.

The index of the cell identifier may be the cell identifier, or may be an index value that is used to uniquely indicate the cell identifier. This is not specifically limited in this application.

Therefore, the CRS frequency offset may be indirectly indicated when the cell identifier is indicated. In addition, the resources that are occupied by the N groups of CRSs may be determined based on the information about the quantity of CRS antenna ports of the cell, to correctly receive data, and improve receiving performance.

With reference to the first aspect, in a third possible implementation of the first aspect, the indication information is at least one index corresponding to CRS antenna port configuration information of at least one cell, and the CRS antenna port configuration information includes a cell identifier and a corresponding quantity of CRS antenna ports, or a quantity of CRS antenna ports of the cell and a CRS frequency offset of the cell, or a cell identifier, a corresponding quantity of CRS antenna ports, and a corresponding CRS frequency offset; and the receiving, by a terminal device, indication information sent by a network device includes:

receiving, by the terminal device, the at least one index corresponding to the CRS antenna port configuration information of the at least one cell that is sent by the network device; and receiving, by the terminal device, an index of the at least one cell identifier that is sent by the network device; and the determining, by the terminal device based on the indication information, the resources that are occupied by the N groups of CRSs includes:

determining, by the terminal device based on an eighth mapping relationship and the at least one index corresponding to the CRS antenna port configuration information of the at least one cell, the resources that are occupied by the N groups of CRSs, where the eighth mapping relationship is used to indicate a mapping relationship between a plurality of indexes and indexes of a plurality of pieces of CRS antenna port configuration information.

Therefore, the CRS frequency offset may be indirectly indicated when the cell identifier is indicated, so that the terminal device may determine the information about the quantity of CRS antenna ports and the frequency offset based on a mapping relationship between a cell identifier and CRS antenna port configuration information of a cell that is obtained in advance, to further determine the resources that are occupied by the N groups of CRSs, thereby correctly receiving data, and improving receiving performance.

It may be understood that the foregoing various mapping relationships (including the first mapping relationship to the eighth mapping relationship) may be configured for the terminal device by using radio resource control (RRC) signaling, or may be pre-negotiated by the network device and the terminal device and stored in each device.

According to a second aspect, a data transmission method is provided, including:

sending, by a network device, indication information to a terminal device, where the indication information is used to determine resources that are occupied by N groups of CRSs, the resources that are occupied by the N groups of CRSs are used to instruct the terminal device to receive data that is sent by at least one network device, and N is a natural number greater than or equal to 2.

The network device may be any one of the at least one network device, or may not be one of the at least one network device. This is not specifically limited in this application.

It should be noted that the indication information may be used to directly or indirectly indicate information about a quantity of CRS antenna ports and a CRS frequency offset. In the resources that are occupied by the N groups of CRSs, quantities of CRS antenna ports corresponding to any two groups of CRSs are different from each other, or CRS frequency offsets corresponding to any two groups of CRSs are different from each other, or both quantities of CRS antenna ports and CRS frequency offsets that are corresponding to any two groups of CRSs are different from each other.

Therefore, in the data transmission method of this embodiment of this application, the indication information is sent to the terminal device, so that the terminal device determines the resources that are occupied by the N groups of CRSs. Therefore, the terminal device may consider CRS resources of all network devices when receiving data, to correctly receive data, and improve receiving performance.

Further, the indication information is corresponding to at least one of the following items: a codeword corresponding to the data, a layer to which the codeword is mapped, or an antenna port (namely, a data antenna port) to which the codeword is mapped.

Optionally, the sending, by a network device, indication information to a terminal device includes:

sending, by the network device, downlink control information DCI to the terminal device, where the DCI includes the indication information.

Therefore, after each field of DCI in an existing protocol is modified or extended, the indication information is borne in the DCI, so that the terminal device may determine, based on the received DCI in a PDCCH, the resources that are occupied by the N groups of CRSs, to correctly receive data in a physical downlink shared channel PDSCH, and improve data receiving performance.

With reference to the second aspect, in a first possible implementation of the second aspect, the indication information includes first indication information that is used to indicate quantities of antenna ports and frequency offsets of the N groups of CRSs; and the sending, by a network device, indication information to a terminal device includes:

determining, by the network device, quantities of antenna ports and frequency offsets for sending the N groups of CRSs; and sending, by the network device, the first indication information to the terminal device based on the quantities of antenna ports and the frequency offsets of the N groups of CRSs.

Therefore, the first indication information that is used to directly indicate a quantity of CRS antenna ports and a frequency offset is sent to the terminal device, so that the terminal device may directly determine, based on the first indication information, the resources that are occupied by the N groups of CRSs, to correctly receive data, and improve receiving performance.

In a possible design, the first indication information is indexes of N first physical downlink shared channel resource element mapping and quasi-co-location indicators PQIs corresponding to the N groups of CRSs, and each first PQI includes information about a quantity of antenna ports and a frequency offset of one group of CRSs; and the sending, by the network device, the first indication information to the terminal device includes:

sending, by the network device, the indexes of the N first PQIs to the terminal device.

Optionally, the index of the first PQI is used to indicate a PDSCH-RE-mapping-QCL-Config parameter set currently used by the terminal device for data transmission.

Optionally, the PDSCH-RE-mapping-QCL-Config parameter set is carried in RRC signaling.

Optionally, the first PQI is a higher layer parameter.

In a possible design, the first indication information is indexes of S second PQIs, and each second PQI includes information about a quantity of antenna ports and a frequency offset of at least one group of CRSs, where S∈[1, N), and S is a natural number; and the sending, by the network device, the first indication information to the terminal device includes:

sending, by the network device, the indexes of the S second PQIs to the terminal device.

Optionally, the first indication information is an index of one second PQI, and the second PQI includes information about the quantities of antenna ports and the frequency offsets of the N groups of CRSs.

Optionally, the index of the second PQI is used to indicate a PDSCH-RE-mapping-QCL-Config parameter set currently used by the terminal device for data transmission.

Optionally, the PDSCH-RE-mapping-QCL-Config parameter set is carried in RRC signaling.

Optionally, the second PQI is a higher layer parameter.

In a possible design, the first indication information includes N indexes of quantities of CRS antenna ports corresponding to the N groups of CRSs and N indexes of CRS frequency offsets corresponding to the N groups of CRSs, the quantity of CRS antenna ports indicates a quantity of antenna ports through which CRSs are sent, and the CRS frequency offset indicates a location of a resource element RE to which the CRS is mapped in a frequency domain resource; and the sending, by the network device, the first indication information to the terminal device includes:

sending, by the network device, the N indexes of the quantities of CRS antenna ports and the N indexes of the CRS frequency offsets to the terminal device.

In a possible design, the first indication information is N indexes of quantities of CRS antenna ports and frequency offsets that are corresponding to the N groups of CRSs, and the quantity of CRS antenna ports and the frequency offset indicate a quantity of antenna ports through which CRSs are sent and a location of an RE to which the CRS is mapped in a frequency domain resource; and the sending, by the network device, the first indication information to the terminal device includes:

sending, by the network device, the N indexes of the quantities of CRS antenna ports and the frequency offsets to the terminal device.

In a possible design, the first indication information is an index of configuration information, the configuration information indicates an index of a quantity of antenna ports and a frequency offset of each of the N groups of CRSs, and the quantity of CRS antenna ports and the frequency offset indicate a quantity of antenna ports through which CRSs are sent and a location of an RE to which the CRS is mapped in a frequency domain resource; and the sending, by the network device, the first indication information to the terminal device includes:

sending, by the network device, the index of the configuration information to the terminal device.

With reference to the second aspect, in a second possible implementation of the second aspect, the indication information includes an index of a cell identifier of at least one cell and information about a quantity of CRS antenna ports of the at least one cell, the cell identifier is used to determine a CRS frequency offset, and the CRS frequency offset indicates a location of an RE to which the CRS is mapped in a frequency domain resource; and the sending, by a network device, indication information to a terminal device includes:

determining, by the network device, to send the index of the cell identifier of the at least one cell and the information about the quantity of CRS antenna ports of the at least one cell to the terminal device.

The index of the cell identifier may be the cell identifier, or may be an index value that is used to uniquely indicate the cell identifier. This is not specifically limited in this application.

Therefore, the CRS frequency offset may be indirectly indicated when the cell identifier is indicated. In addition, the resources that are occupied by the N groups of CRSs may be determined based on configuration information of the quantity of antenna ports of the cell, to correctly receive data, and improve receiving performance.

With reference to the second aspect, in a third possible implementation of the second aspect, the indication information is at least one index corresponding to CRS antenna port configuration information of at least one cell, and the CRS antenna port configuration information includes a cell identifier and a corresponding quantity of CRS antenna ports, or a quantity of CRS antenna ports of the cell and a CRS frequency offset of the cell, or a cell identifier, a corresponding quantity of CRS antenna ports, and a corresponding CRS frequency offset; and the sending, by a network device, indication information to a terminal device includes:

determining, by the network device, to send the at least one index corresponding to the CRS antenna port configuration information of the at least one cell to the terminal device.

Therefore, the CRS frequency offset may be indirectly indicated when the cell identifier is indicated, so that the terminal device may determine the information about the quantity of CRS antenna ports and the frequency offset based on a mapping relationship between a cell identifier and CRS antenna port configuration information of a cell that is obtained in advance, to further determine the resources that are occupied by the N groups of CRSs, thereby correctly receiving data, and improving receiving performance.

According to a third aspect, a terminal device is provided to perform the method according to the first aspect or any possible implementation of the first aspect. The terminal device may include units that are configured to perform the method according to the first aspect or any possible implementation of the first aspect.

According to a fourth aspect, a network device is provided to perform the method according to the second aspect or any possible implementation of the second aspect. The network device may include units that are configured to perform the method according to the second aspect or any possible implementation of the second aspect.

According to a fifth aspect, a terminal device is provided, including a transceiver, a processor, a memory, and a bus system, where the transceiver, the processor, and the memory are connected to each other by using the bus system, the memory is configured to store an instruction, and the processor is configured to execute the instruction that is stored in the memory, so that the processor performs the method according to the first aspect or any possible implementation of the first aspect.

According to a sixth aspect, a network device is provided, including a transceiver, a processor, a memory, and a bus system, where the transceiver, the processor, and the memory are connected to each other by using the bus system, the memory is configured to store an instruction, and the processor is configured to execute the instruction that is stored in the memory, so that the processor performs the method according to the second aspect or any possible implementation of the second aspect.

According to a seventh aspect, a computer readable storage medium is provided and is configured to store a computer program, and the computer program includes an instruction that is used to perform the method according to the first aspect or any possible implementation of the first aspect.

According to an eighth aspect, a computer readable storage medium is provided and is configured to store a computer program, and the computer program includes an instruction that is used to perform the method according to the second aspect or any possible implementation of the second aspect.

According to a ninth aspect, a computer program product is provided, the computer program product includes computer program code, and when the computer program code runs on a computer, the computer performs the method according to the first aspect or any possible implementation of the first aspect.

According to a tenth aspect, a computer program product is provided, the computer program product includes computer program code, and when the computer program code runs on a computer, the computer performs the method according to the second aspect or any possible implementation of the second aspect.

The network device provided in this application has a function of implementing actions of the network device in the aspects of the foregoing method, and includes corresponding components (components) that are configured to implement steps or functions described in the aspects of the foregoing method. The steps or the functions may be implemented by using software, hardware, or a combination of the software and the hardware.

In a possible design, the foregoing network device includes one or more processors and communications units. The one or more processors are configured to support the network device in performing a corresponding function in the foregoing method, for example, generating indication information. The communications unit is configured to support the network device in communicating with another device, to implement a receiving and/or sending function, for example, sending the indication information that is generated by the processor.

Optionally, the network device may further include one or more memories, where the memory is configured to couple to the processor and stores a program instruction and/or data necessary for the network device. The one or more memories may be integrated with the processor, or may be separately disposed with the processor. This is not limited in this application.

The network device may be a base station, a gNB, a TRP, or the like. The communications unit may be a transceiver or a transceiver circuit. Optionally, the transceiver may be an input/output circuit or interface.

The network device may alternatively be a communications chip. The communications unit may be an input/output circuit or interface of the communications chip.

This application further provides an apparatus. The apparatus has a function of implementing actions of the terminal in the aspects of the foregoing method, and includes corresponding components (component) that are configured to implement steps or functions described in the aspects of the foregoing method. The steps or the functions may be implemented by using software, hardware, or a combination of the software and the hardware.

In a possible design, the foregoing apparatus includes one or more processors and communications units. The one or more processors are configured to support the apparatus in performing a corresponding function in the foregoing method, for example, determining resources that are occupied by N groups of CRSs. The communications unit is configured to support the apparatus in communicating with another device, to implement a receiving and/or sending function, for example, receiving indication information or receiving data.

Optionally, the apparatus may further include one or more memories, where the memory is configured to couple to the processor and stores a program instruction and/or data necessary for the apparatus. The one or more memories may be integrated with the processor, or may be separately disposed with the processor. This is not limited in this application.

The apparatus may be an intelligent terminal, a wearable device, or the like. The communications unit may be a transceiver or a transceiver circuit. Optionally, the transceiver may be an input/output circuit or interface.

The apparatus may alternatively be a communications chip. The communications unit may be an input/output circuit or interface of the communications chip.

According to an eleventh aspect, a chip system is provided, where the chip system includes a processor, configured to support a terminal device in implementing functions in the foregoing aspects, for example, generating, receiving, sending, or processing data and/or information in the foregoing methods. In a possible design, the chip system further includes a memory, and the memory is configured to store a program instruction and data necessary for the terminal device. The chip system may include chips, or may include chips and other discrete devices.

According to a twelfth aspect, a chip system is provided, where the chip system includes a processor, configured to support a network device in implementing functions in the foregoing aspects, for example, generating, receiving, sending, or processing data and/or information in the foregoing methods. In a possible design, the chip system further includes a memory, and the memory is configured to store a program instruction and data necessary for the network device. The chip system may include chips, or may include chips and other discrete devices.

DESCRIPTION OF EMBODIMENTS

The following describes technical solutions of this application with reference to accompanying drawings.

It should be understood that the technical solutions of this application may be applied to various communications systems, such as: a Global System for Mobile Communications (GSM), a Code Division Multiple Access (CDMA) system, a Wideband Code Division Multiple Access (WCDMA) system, a general packet radio service (GPRS), a Long Term Evolution (LTE) system, a Long Term Evolution Advanced (LTE-A) system, a Universal Mobile Telecommunications System (UMTS), and a 5G system.

Figure 1:
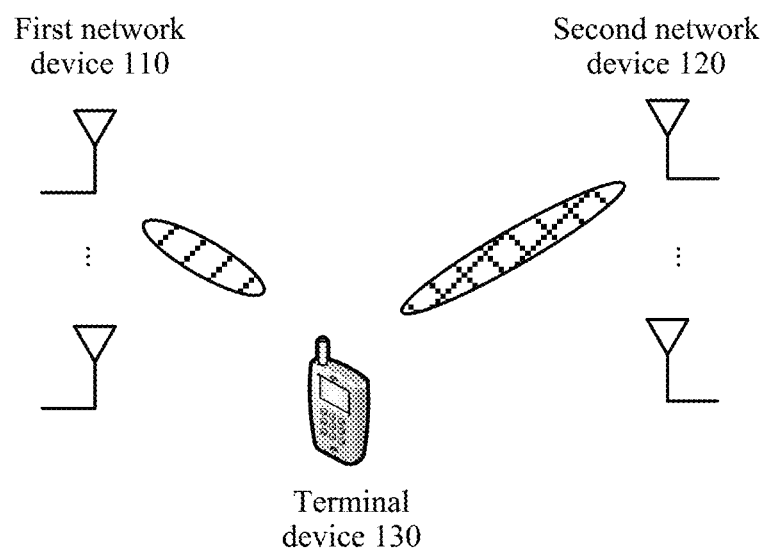
FIG. 1 is a schematic diagram of a wireless communications system applicable to an embodiment of this application.

FIG. 1 shows a wireless communications system 100 applicable to an embodiment of this application. The wireless communications system 100 may include at least one network device, for example, a first network device 110 and a second network device 120 shown in FIG. 1. Both the first network device 110 and the second network device 120 may communicate with a terminal device 130 through a wireless air interface. The first network device 110 and the second network device 120 may provide communication coverage for a specific geographic area, and may communicate with a terminal device located in the coverage area. The first network device 110 or the second network device 120 may be a base transceiver station (BTS) in a GSM system or a CDMA system, a NodeB (NodeB) in a WCDMA system, an evolved NodeB (eNB, or eNodeB) in an LTE system, or a network device in a future 5G network, for example, a transmission point (TP), a transmission reception point (TRP), a 5G gNB (gNB), a base station, or a small-cell device. This is not specifically limited in this embodiment of this application.

For example, the first network device 110 or the second network device 120 may be an evolved NodeB (eNB), a radio network controller (RNC), a NodeB (NB), a base station controller (BSC), a base transceiver station (BTS), a home eNodeB (for example, Home evolved NodeB or Home NodeB, HNB), a baseband unit (BBU), a Wireless Fidelity (Wi-Fi), an access point (AP), or a transmission point (TRP or transmission point, TP); or may be a gNB or a transmission point (TRP or TP) in a 5G system such as a new radio (NR) system; or may be a network node that includes a gNB or a transmission point, for example, a baseband unit (BBU) or a data unit (DU).

In some deployments, the gNB may include a control unit (CU) and a data unit (DU). The gNB may further include a radio frequency unit (RFU). The CU implements some functions of the gNB, and the DU implements some functions of the gNB. For example, the CU implements functions of a radio resource control (RRC) layer and a Packet Data Convergence Protocol (PDCP) layer, and the DU implements functions of a radio link control (RLC) layer, a media access control (MAC) layer, and a physical (PHY) layer. Information at the RRC layer may finally become information at the PHY layer, or may be converted from information at the PHY layer. Therefore, in this architecture, higher layer signaling such as RRC layer signaling or PHCP layer signaling may also be considered as being sent by the DU, or being sent by the DU and the RFU.

The wireless communications system 100 further includes one or more terminal devices (UE) 130 located in the coverage area of the first network device 110 and the second network device 120. The terminal device 130 may be mobile or fixed. The terminal device 130 may communicate with one or more core networks through a radio access network (RAN). The terminal device may be referred to as an access terminal, a terminal device, a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or the like.

The wireless communications system 100 may support coordinated multipoint (CoMP) transmission. In other words, a plurality of cells or a plurality of transmission points may coordinate to send data to a same terminal device in a same time-frequency resource, or send data to a same terminal device in time-frequency resources that partially overlap. The plurality of cells may belong to a same network device or different network devices, and may be selected based on a channel gain or a path loss, received signal strength, a signal receiving instruction, and the like.

The terminal device 130 in the wireless communications system 100 may support multipoint transmission. In other words, the terminal device 130 may communicate with the first network device 110, and may also communicate with the second network device 120. The first network device 110 may act as a serving network device, and the serving network device is a network device that provides services such as an RRC connection, non-access stratum (NAS) mobility management, and security input for the terminal device by using a wireless air interface protocol, or the serving network device may be a network device that provides at least one of services such as an RRC connection, NAS mobility management, and security input for the terminal device by using a wireless air interface protocol.

Optionally, the first network device may be the serving network device, and the second network device may be a coordinated network device; or the first network device may be a coordinated network device, and the second network device may be the serving network device. The serving network device may send control signaling to the terminal device, and the coordinated network device may send data to the terminal device; or the serving network device may send control signaling to the terminal device, and the serving network device and the coordinated network device may send data to the terminal device at the same time; or the serving network device and the coordinated network device may send control signaling to the terminal device at the same time, and the serving network device and the coordinated network device may send data to the terminal device at the same time; or the coordinated network device may send control signaling to the terminal device, and at least one of the serving network device and the coordinated network device may send data to the terminal device; or the coordinated network device may send both control signaling and data to the terminal device. This is not specifically limited in this embodiment of this application.

For example, the first network device is the serving network device, and the second network device is the coordinated network device. There may be one or more second network devices, and the second network device and the first network device are network devices that meet different quasi-co-locations (QCL). An antenna port QCL is defined as that signals sent from antenna ports of the QCL may experience same large-scale fading, and the large-scale fading includes delay spread, Doppler spread, Doppler frequency shift, an average channel gain, and an average delay.

It may be understood that both the first network device and the second network device may be serving network devices, for example, in a non-cell scenario.

It should be further noted that this embodiment of this application is also applicable to a same network device with non-QCL antenna ports. In other words, the network device may be configured with different antenna panels, antenna ports in the same network device that belong to different antenna panels may be non-QCL antenna ports, and CRS resource configurations corresponding to the antenna ports may also be different.

For ease of understanding the embodiments of this application, before a data transmission method of the embodiments of this application is described, a codeword-to-layer mapping relationship and a layer-to-antenna port mapping relationship are first briefly described.

User plane data and a signaling message need to be processed by a PDCP/RLC/MAC layer before reaching a physical layer and being sent by an air interface. Data that is processed at the physical layer is a protocol data unit (PDU), namely, a data stream, at the MAC layer. A data stream from an upper layer becomes a codeword after being channel encoded. Different data streams are differentiated by different codewords. Because a quantity of codewords is not consistent with a quantity of transmit antennas, codewords may be mapped to different transmit antennas. Therefore, layer mapping and precoding need to be performed. The layer mapping may be understood as that the codewords are remapped to a plurality of layers according to a specific rule. The precoding may be understood as that data mapped to a plurality of layers is mapped to different antenna ports (for ease of differentiation and description, an antenna port to which a codeword is mapped is recorded as a data antenna port).

The network device encodes data to obtain a codeword, maps the codeword to a layer and then to a data antenna port, sends the codeword to the terminal device through a corresponding data antenna port, and sends a demodulation reference signal through a corresponding data antenna port, so that the terminal device performs demodulation processing on received data based on the demodulation reference signal (DMRS), to obtain original data.

It should be noted that the antenna port may be understood as a transmit antenna that can be identified by a receive end device, or a transmit antenna that can be differentiated in space. The antenna port may be defined based on a reference signal (or a pilot signal, for example, a DMRS or a CRS) that is associated with the antenna port. One antenna port may be one physical antenna in a transmit end device, or may be a weighted combination of a plurality of physical antennas in a transmit end device. In the embodiments of this application, unless otherwise specified, one antenna port is corresponding to one reference signal.

In the prior art, when sending data to the terminal device, the serving network device and the coordinated network device may separately send a CRS and a DMRS to the terminal device. The CRS may be used for channel estimation, and the DMRS may be used for data demodulation. A person skilled in the art may understand that an antenna port (namely, a data antenna port) through which the network device sends the DMRS to the terminal device is corresponding to an antenna port through which the network device sends the CRS to the terminal device, because the antenna port may be understood as a transmit antenna that is identified by a receive end device, or a transmit antenna that can be differentiated in space. The antenna port may be defined based on an associated reference signal. Actually, the network device may send the CRS and the DMRS to the terminal device by using a same physical antenna or a plurality of physical antennas. Therefore, the antenna port through which the network device sends the DMRS to the terminal device is corresponding to the antenna port through which the network device sends the CRS to the terminal device.

It should be noted that the antenna port through which the DMRS is sent is usually used to send data, and therefore, an antenna port through which data is sent is different from but corresponding to the antenna port through which the CRS is sent.

Figure 2:
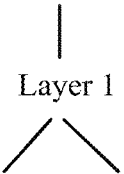
FIG. 2 is a schematic diagram of a CoMP transmission scenario applicable to an embodiment of this application.

For ease of understanding the embodiments of this application, the following describes in detail a specific CoMP transmission scenario with reference to FIG. 2. FIG. 2 is a schematic diagram of a CoMP transmission scenario applicable to an embodiment of this application.

(a) in FIG. 2 shows a multipoint and multi-stream scenario. As shown in the figure, one codeword (for example, which is recorded as a CW1) may be mapped to one layer (for example, which is recorded as a layer 1) through layer mapping, and then is mapped to a data antenna port (for example, which is recorded as a port 1). The data antenna port belongs to a TP or a TRP (for example, which is recorded as a TP1, namely, an example of a network device). In other words, data corresponding to the CW1 is sent to a terminal device by the TP1 through the port 1. Similarly, another codeword (for example, which is recorded as a CW2) may be mapped to a layer (for example, which is recorded as a layer 2) through layer mapping, and then is mapped to a data antenna port (for example, which is recorded as a port 2). The data antenna port belongs to another TP (for example, which is recorded as a TP2, namely, another example of the network device). In other words, data corresponding to the CW2 is sent to the terminal device by the TP2 through the port 2. In other words, different TPs transmit different codewords. In this case, a codeword is corresponding to a layer, the layer is corresponding to a data antenna port, and the data antenna port is corresponding to a TP.

(b) in FIG. 2 shows another multipoint and multi-stream scenario. As shown in the figure, one codeword (for example, a CW1) may be mapped to two layers (for example, a layer 1 and a layer 2) through layer mapping, and then is mapped to different data antenna ports (for example, a port 1 and a port 2). The port 1 and the port 2 belong to different TPs (for example, a TP1 and a TP2). In other words, data corresponding to the CW1 is sent to a terminal device by the TP1 and the TP2 through the port 1 and the port 2. In other words, different TPs transmit different layers of a same codeword. In this case, a layer is corresponding to a data antenna port, and the data antenna port is corresponding to a TP.

(c) in FIG. 2 shows a single frequency network (SFN) scenario. As shown in the figure, one codeword (for example, a CW1) may be mapped to two layers (for example, a layer 1 and a layer 2) through layer mapping, and then is mapped to different data antenna ports (for example, a port 1 and a port 2). Data mapped to each antenna port may be sent to a terminal device by using different TPs (for example, a TP1 and a TP2). In other words, different TPs jointly transmit a same layer of a same codeword. In this case, a layer is corresponding to a data antenna port.

It should be understood that the scenario shown in (c) of FIG. 2 may also be corresponding to a coherent joint transmission (JT) scenario. In other words, a plurality of antennas of a plurality of TPs jointly perform precoding, to transmit data to a terminal device.

(d) in FIG. 2 shows a multiple point block coding (MPBC) scenario. As shown in the figure, one codeword (for example, a CW1) may be mapped to one layer (for example, a layer 1) through layer mapping, and then may be mapped to different data antenna ports (for example, a port 1 and a port 2) in different encoding manners. The different data antenna ports belong to different TPs (for example, a TP1 and a TP2), and data is sent to a terminal device by using the different TPs. In other words, different TPs transmit different coded information of same data of a same layer of a same codeword. In this case, a data antenna port is corresponding to a TP.

It should be understood that the scenario shown in (d) of FIG. 2 may also be corresponding to a space frequency block coding (SFBC) scenario. In other words, a plurality of TPs may separately perform precoding, and then jointly perform SFBC, to transmit data to a terminal device.

It may be learned from the scenarios shown above that when receiving data, a same terminal device may receive data that is sent by one or more TPs through one or more data antenna ports. When there are a plurality of TPs or a plurality of data antenna ports, if the terminal device learns of only a resource occupied by a CRS used by a serving TP, data receiving performance of the terminal device may be reduced.

Figure 3A:
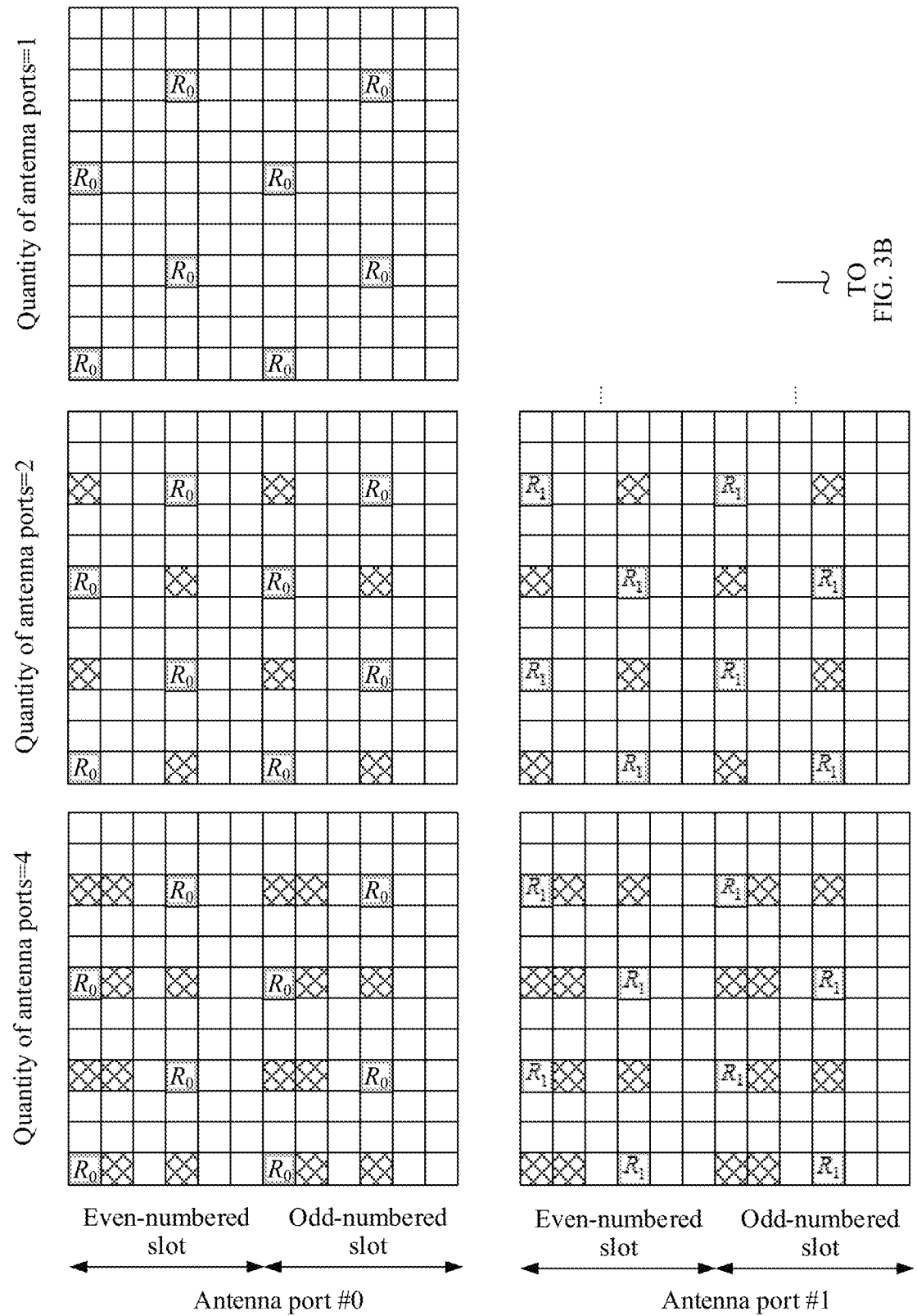
FIG. 3A and FIG. 3B are a mapping location diagram of an RE of a CRS under different quantities of antenna ports in a conventional cyclic prefix (CP) case.
Figure 3B:
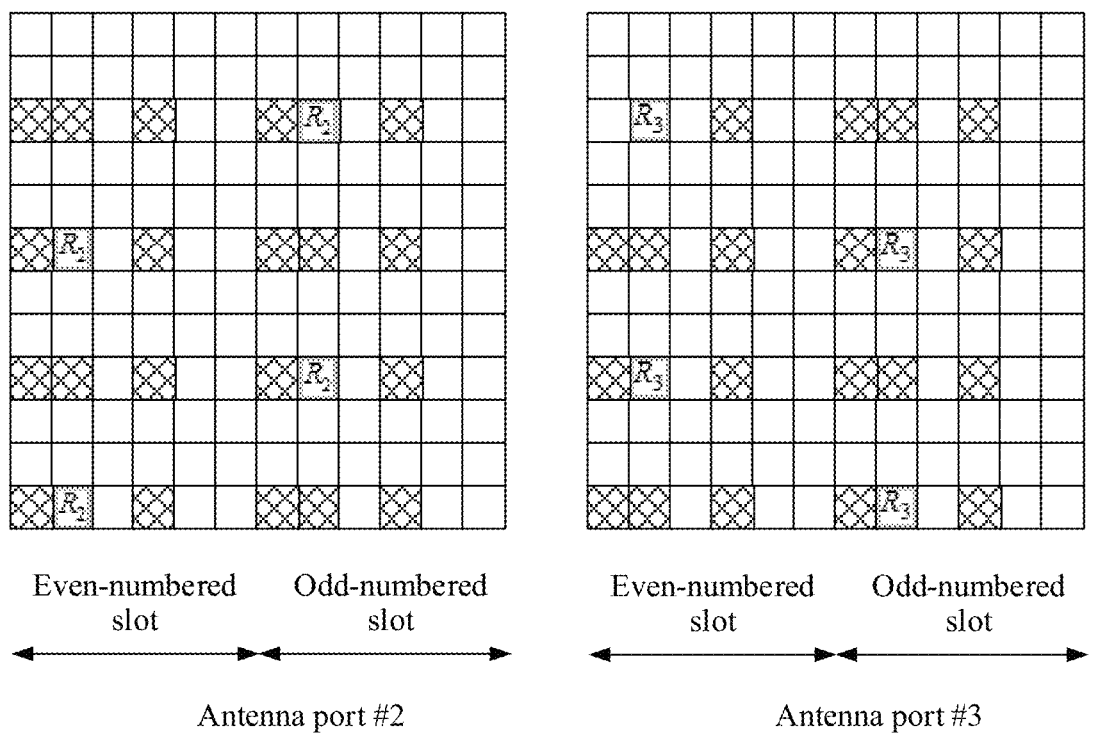

For ease of understanding the embodiments of this application, the following briefly describes a mapping location diagram (or referred to as a pilot pattern) of a resource element (RE) of a CRS under different quantities of antenna ports (for example, CRS antenna ports) with reference to FIG. 3A and FIG. 3B.

FIG. 3A and FIG. 3B show a mapping location diagram of an RE of a CRS under different quantities of antenna ports (quantities of antenna ports are respectively 1, 2, and 4) in a conventional cyclic prefix (CP) case. It should be understood that the pilot pattern shown in FIG. 3A and FIG. 3B is merely an example for ease of understanding, and shall not constitute any limitation on the embodiments of this application. For example, the CRS pilot pattern further includes a mapping location diagram of an RE of a CRS under different quantities of antenna ports in an extended CP case, and in a future protocol, even includes a mapping location diagram of an RE of a CRS under more quantities of antenna ports.

As shown in FIG. 3A and FIG. 3B,  in the figure represents a mapping location of an RE of a CRS, and an R0, an R1, an R2, and an R3 respectively represent mapping locations of REs of CRSs of different antenna ports. It may be learned that locations of REs to which resources that are occupied by CRSs of different antenna ports are mapped in a pair of resource blocks (RB) are different. In other words, time-frequency resources that are occupied by CRSs of different antenna ports are different. When sending data through one or more data antenna ports, a network device needs to consider interference that is on data transmission of the network device and that is caused by a resource occupied by a CRS sent by another coordinated network device; otherwise, a decoding error of a terminal device may be caused. Therefore, when sending data through one or more data antenna ports, the network device needs to keep away from resources that are occupied by CRSs sent by network devices, and does not transmit data on time-frequency resources corresponding to REs to which a plurality of groups of CRSs are mapped. In other words, data mapping is not performed on the plurality of groups of CRS resources, or puncturing is performed after mapping.

FIG. 3A and FIG. 3B show mapping locations of REs of CRSs when quantities of CRS antenna ports are respectively 1, 2, and 4. It may be learned that when a quantity of antenna ports is 1 (for example, an antenna port #0), mapping locations of REs of only one group of CRSs need to be considered. When a quantity of antenna ports is 2 (for example, an antenna port #0 and an antenna port #1), not only a mapping location of an RE of a CRS of the antenna port #0 needs to be considered, but also a mapping location of an RE of a CRS of the antenna port #1 needs to be considered. In other words, data is not transmitted on time-frequency resources corresponding to  and  shown in the figure. When a quantity of antenna ports is 4 (for example, an antenna port #0, an antenna port #1, an antenna port #2, and an antenna port #3), not only a mapping location of an RE of a CRS of the antenna port #0 needs to be considered, but also mapping locations of REs of CRSs of the antenna port #1, the antenna port #2, and the antenna port #3 need to be considered.

It should be noted that a number of an antenna port that is used to send a CRS is usually one or more of 0, 1, 2, and 3, but this shall not constitute any limitation on this application. In this application, a case in which more or fewer antenna ports that are used to send a CRS and more or fewer antenna port numbers are defined in a future protocol is not excluded.

Then referring to the scenarios shown in FIG. 2, the terminal device needs to learn of a CRS resource that is used

by each TP to send data through each data antenna port. Therefore, this application provides a data transmission method in which the network device indicates resource configuration statuses of at least two groups of CRSs to the terminal device, so that the terminal device can correctly receive data, and improve data receiving performance.

Figure 4:
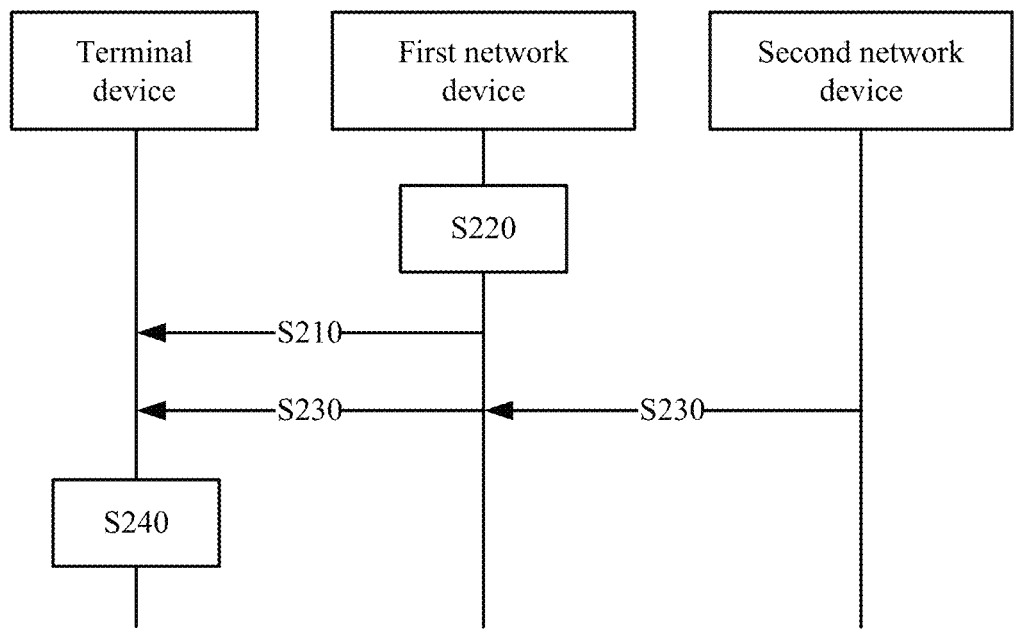
FIG. 4 is a schematic flowchart of a data transmission method according to an embodiment of this application.

The following describes in detail the data transmission method of the embodiments of this application with reference to FIG. 4.

It should be understood that FIG. 4 is a schematic flowchart of a data transmission method according to an embodiment of this application, and shows specific communication steps or operations of the method. However, these steps or operations are merely examples, and another operation or transformations of various operations in FIG. 4 may be further performed in this embodiment of this application. In addition, the steps in FIG. 4 may be performed in a sequence different from that shown in FIG. 4, and not all operations in FIG. 4 need to be performed.

FIG. 4 is a schematic flowchart of a data transmission method 200 according to an embodiment of this application from a perspective of device interaction. The method 200 may be applied to a communications system in which a wireless air interface is used for communication, and the communications system may include at least one network device and at least one terminal device. For example, the communications system may be the wireless communications system 100 shown in FIG. 1.

Optionally, the network device may be a transmission point (TP) or a base station, or may be another network device that is used to send downlink control information (DCI). This is not specifically limited in this embodiment of this application.

Without loss of generality, interaction between a first network device (for ease of differentiation and description, which is recorded as the first network device) and the terminal device is used as an example to describe in detail the method 200 below. It should be understood that the first network device may be any one of the foregoing at least one network device. For example, the first network device may be a serving network device of the terminal device, or may be a coordinated network device of the terminal device. Alternatively, the first network device may not be any one of the foregoing at least one network device. This is not specifically limited in this embodiment of this application. "First" is merely used for differentiation and description, and shall not constitute any limitation on this embodiment of this application. It should be further understood that the terminal device may communicate with and be connected to the first network device, and may further perform data communication with one or more other network devices (for example, a second network device). This is not specifically limited in this embodiment of this application.

As shown in FIG. 4, the method 200 includes the following steps.

S210. The first network device sends indication information to the terminal device.

When sending data to the terminal device, the network device first needs to send a CRS to perform channel estimation. A data antenna port that is used by the network device to send the data is corresponding to a resource that is used to send the CRS. In other words, the data is not mapped to the resource that is used to send the CRS, or the resource is punctured after the data is mapped to the resource.

In this embodiment of this application, it is assumed that the data is obtained after the foregoing at least one network device maps one codeword to at least one data antenna port. That the at least one network device sends data to the terminal device may be corresponding to a scenario shown in FIG. 2 (for example, (b) to (d) in FIG. 2). In this embodiment of this application, the codeword may be corresponding to the example CW1 described above, the first network device may be corresponding to the example TP1 described above, and the second network device may be corresponding to the example TP2 described above.

It should be understood that the scenario shown in FIG. 2 is shown merely for ease of understanding, and shall not constitute any limitation on this application, and this application is not limited thereto. For example, the first network device may alternatively be a network device other than the TP1 and the TP2 shown in FIG. 2. In other words, the at least one network device that sends data to the terminal device may include the first network device, or may not include the first network device.

A time-frequency resource that is used by the at least one network device to send N groups of CRSs is different from a time-frequency resource that is used by the at least one network device to send data. In other words, an RE to which the CRS is mapped and an RE to which the data is mapped do not overlap in each RB.

Therefore, the first network device may send indication information to the terminal device based on resources configured by each network device for the N groups of CRSs, and the indication information is used by the terminal device to determine the resources occupied by the N groups of CRSs. In a possible implementation, the first network device may add the indication information to DCI that is to be sent to the terminal device, so that when receiving the DCI, the terminal device may determine the resources of the N groups of CRSs based on the indication information carried in the DCI, and further prohibit data receiving in a corresponding resource.

Optionally, S210 may specifically include:

The first network device sends DCI to the terminal device, and the DCI carries the indication information.

It should be understood that the method in which the indication information is carried in the DCI described herein is merely a possible implementation, and shall not constitute any limitation on this embodiment of this application. The indication information may alternatively be carried in another message or signaling, and this is not specifically limited in this embodiment of this application.

Optionally, before S210, the method 200 further includes:

S220. The first network device determines configuration information of resources of the N groups of CRSs.

In other words, before sending the indication information to the terminal device, the first network device needs to obtain the configuration information of the resources of the N groups of CRSs from each network device, to generate the indication information.

In a possible implementation, when sending data, each of the at least one network device may determine CRS configuration information. In addition, each network device may send, through an interface (for example, an X2 interface) between network devices, the CRS configuration information that is determined by each network device to the first network device.

It may be understood that when data is sent by using different data antenna ports, correspondingly, locations of resources for sending CRSs may also be different. Therefore, each network device may determine configuration information of corresponding P groups of CRSs for M data antenna ports. M represents a quantity of data antenna ports through which a network device sends data, P is less than or equal to N, M and P are natural numbers, and values of M and P vary with the network device. In other words, in the N groups of CRSs corresponding to the data, CRSs (namely, the foregoing P groups of CRSs) corresponding to each data antenna port are a part of or all the N groups of CRSs.

As an example instead of a limitation, the configuration information may include information about a quantity of CRS antenna ports and a frequency offset. Frequency offset information of a CRS may be understood as an offset, relative to a preset pilot pattern (for example, as shown in FIG. 3A and FIG. 3B), of an RE to which the CRS is mapped in a frequency domain resource.

One group of CRSs herein represents a set of CRSs whose locations, determined based on a quantity of CRS antenna ports and a frequency offset, of REs to which the CRSs are mapped in the frequency domain resource are the same. In other words, any two groups of CRSs are different from each other in at least one of a quantity of antenna ports and a frequency offset.

It should be noted herein that the resource occupied by the CRS may include a space domain resource, a time domain resource, and a frequency domain resource. In this embodiment of this application, it may be assumed that an offset of the time domain resource is zero relative to the preset pilot pattern. In other words, the time domain resource keeps unchanged referring to the preset pilot pattern. The frequency offset in frequency domain is calculated based on a cell identifier. $v_{shift}=N_{ID}^{cell} \mod 6$, where $v_{shift}$ represents the frequency offset, $N_{ID}^{cell}$ represents the cell identifier, and mod represents an REM operation. Interference from a neighboring cell may be reduced by introducing the frequency offset. In addition, the space domain resource may be understood as that different antenna ports may be corresponding to different resources in space domain.

It should be understood that this embodiment of this application mainly describes in detail frequency domain resources that are used by CRSs of different network devices, but this shall not constitute any limitation on this embodiment of this application. For example, time domain resources that are used by CRSs of different network devices may also be different, and the method in this embodiment of this application may also be used to indicate an offset in time domain (namely, a time offset) of a CRS relative to the pilot pattern.

It should be further understood that in this embodiment of this application, that the pilot pattern shown in FIG. 3A and FIG. 3B is used as the preset pilot pattern is merely used as an example for description, and shall not constitute any limitation on this embodiment of this application. In this embodiment of this application, a possibility that a CRS resource that is configured under different quantities of antenna ports is deleted or modified in a future protocol, and a possibility that a CRS resource that is configured under more or fewer CRS antenna ports is defined are not excluded.

S230. The at least one network device sends data and indication information of resources occupied by the N groups of CRSs.

In this embodiment of this application, it is assumed that the at least one network device may include the first network device and the second network device. After determining an antenna port that is used to send data and a resource that is used to send a CRS, the network devices may send data and the N groups of CRSs to the terminal device.

The indication information is corresponding to at least one of the following items: a codeword corresponding to the data, a layer to which the codeword is mapped, or a data antenna port to which the codeword is mapped. A resource occupied by a CRS corresponding to each codeword, each layer, or each data antenna port is a part of or all resources that are occupied by the foregoing N groups of CRSs. The data is obtained after the at least one network device maps one codeword to the data antenna ports.

It should be understood that a specific process in which the network device sends the data and the CRS is similar to that in the prior art. For brevity, details of the specific process are not described herein.

It should be further understood that the steps in which the first network device and the second network device send the data to the terminal device that are shown in FIG. 4 are merely an example for description. The at least one network device that sends data to the terminal device may be only the first network device or only the second network device, or may be one or more other network devices. The at least one network device that sends data to the terminal device is not specifically limited in this application.

It should be noted herein that before sending data to the terminal device, each of the at least one network device may learn of resources (namely, the resources of the N groups of CRSs described above) that are occupied by all network devices to send the CRSs. Therefore, in a data mapping process, the resources that are occupied by all network devices to send the CRSs may be bypassed. In other words, data mapping is not performed on REs to which the N groups of CRSs are mapped, or puncturing is performed after data mapping.

S240. The terminal device determines, based on the indication information, the resources that are occupied by the N groups of CRSs, and receives data based on the resources that are occupied by the N groups of CRSs.

After determining, based on the indication information, the resources that are occupied by the N groups of CRSs, the terminal device may determine, in data receiving, to bypass the REs to which the N groups of CRSs are mapped, and prohibit data receiving on these REs.

With reference to the scenarios shown in FIG. 2, the following describes in detail a specific method in which the first network device instructs, by using different field indication information in the DCI, the terminal device to determine the resources of the N groups of CRSs.

Optionally, the indication information includes first indication information that is used to indicate a quantity of CRS antenna ports and a frequency offset.

The frequency offset may be used to determine a location of an RE to which the CRS is mapped in a frequency domain resource.

S210 may specifically include:

the first network device determines quantities of antenna ports and frequency offsets for sending the N groups of CRSs; and the first network device sends the first indication information to the terminal device, where the first indication information is used to indicate the quantities of antenna ports and the frequency offsets of the N groups of CRSs.

That the first network device sends the first indication information to the terminal device includes the following four methods (namely, a method 1 to a method 4).

Method 1:

The first indication information may be specifically carried by a PQI. In other words, the PQI is used to indirectly indicate the first indication information.

It should be noted that in an existing LTE protocol, the PQI is usually a PDSCH resource element mapping and quasi-co-location indicator (RE Mapping and Quasi-Co- Location Indicator). In this embodiment of this application, the PQI may be a PDSCH-RE-mapping-QCL-Config parameter set, the PDSCH-RE-mapping-QCL-Config parameter set may be a higher layer parameter, and the higher layer parameter may be carried in RRC signaling. An index of the PQI may be used to indicate the PDSCH-RE-mapping-QCL-Config parameter set. In other words, in this embodiment of this application, the index of the PQI may have a same or similar function with a PQI that is defined in the LTE protocol. For brevity, a same or similar case is not described below.

In a possible design, an indication field of a transport block (TB) may be extended in existing DCI. In other words, an indication field of a TB that is defined in an existing protocol carries an index (or a value (Value)) of only one first PQI. In this embodiment of this application, the indication field of the TB is extended, and indexes of N PQIs are carried in the indication field of the TB.

Optionally, the first indication information includes indexes of N first physical downlink shared channel resource element mapping and quasi-co-location indicators PQIs, and each first PQI includes information about a quantity of antenna ports and a frequency offset of one group of CRSs.

That the first network device sends the first indication information to the terminal device includes:

sending, by the first network device, the indexes of the N first PQIs to the terminal device.

The indexes of the N first PQIs are one-to-one corresponding to the N groups of CRSs. An $i^{th}$ first PQI is used to determine a resource occupied by an $i^{th}$ group of CRSs, $i \in [1, N]$, and i is a natural number.

Correspondingly, that the terminal device receives the first indication information sent by the network device includes:

receiving, by the terminal device, the indexes of the N first PQIs that are sent by the network device; and that the terminal device determines, based on the indication information, the resources that are occupied by the N groups of CRSs includes:

determining, by the terminal device based on a first mapping relationship and the indexes of the N first PQIs, the resources that are occupied by the N groups of CRSs, where the first mapping relationship is used to indicate a mapping relationship between indexes of a plurality of first PQIs and a plurality of higher layer parameter groups.

It should be noted herein that the first PQI is merely used for differentiation from a second PQI described below, and shall not constitute any limitation on this application. In this embodiment of this application, the first PQI may be the same as a PQI in the prior art (specific content included in the first PQI may be specifically described below).

In this embodiment of this application, for example, the quantities of antenna ports of the CRSs are respectively 1, 2, and 4. It is assumed that each network device sends a CRS by using one, two, or four antenna ports in an antenna port 0, an antenna port 1, an antenna port 2, and an antenna port 3, and there may be respectively six, three, and three selections of a corresponding frequency offset. Therefore, $C_4^1 \times 6 \pm C_4^2 \times 3 + C_4^4 \times 3 = 45$ PDSCH-RE-mapping-QCL-Config parameter sets may be configured in total.

In PDSCH transmission, the network device may configure the foregoing plurality of PDSCH-RE-mapping-QCL-Config parameter sets (or referred to as higher layer parameters) by using RRC signaling. Alternatively, the network device and the terminal device may pre-negotiate and store the foregoing plurality of PDSCH-RE-mapping-QCL-Config parameter sets (or referred to as higher layer parameters).

In PDCCH transmission, DCI is sent on a PDCCH. Indexes of N first PQIs in the DCI are used to indicate a specific PDSCH-RE-mapping-QCL-Config parameter set currently used by the terminal device for data transmission, so that the terminal device performs rate matching based on the PDSCH-RE-mapping-QCL-Config parameter set.

The DCI may indicate a corresponding PDSCH-RE-mapping-QCL-Config parameter set by using an information bit (namely, an index of a first PQI). Table 1 shows a mapping relationship (namely, the first mapping relationship) between a plurality of information bits and a plurality of PDSCH-RE-mapping-QCL-Config parameter sets.

TABLE 1

| Information bit of a first PQI | Index of a higher layer parameter |
| --- | --- |
| 00 | 1 |
| 01 | 2 |
| 10 | 3 |
| 11 | 4 |

The higher layer parameter may be understood as a parameter that is configured by using a higher layer and delivered by using RRC signaling. The higher layer parameter may include the following content:

1. CRS configuration (including a quantity of CRS antenna ports and a frequency offset);
2. PDSCH start point;
3. Multimedia Broadcast multicast service Single Frequency Network (MBSFN) subframe configuration;
4. Zero power CSI-RS configuration;
5. RS for beam management configuration;
6. Port number of an antenna port that is used to send data;
7. Scrambling identity; and
8. Mapping relationship between a codeword and a layer.

The CRS configuration may be used to determine pilot information that is required by PDSCH RE mapping. Therefore, in this embodiment of this application, an index of one first PQI is sent for antenna ports of each group of CRSs, so that the terminal device determines, based on an index of each first PQI, a resource occupied by a CRS.

It should be understood that the specific content included in the higher layer parameter that is listed above is merely an example for description, and shall not constitute any limitation on this embodiment of this application. A possibility that the specific content of the higher layer parameter is deleted, modified, or extended in a future standard is not excluded in this embodiment of this application.

In addition, it should further be noted that the $i^{th}$ group of CRSs in the N groups of CRSs may be sent by at least one network device (for example, which is recorded as a first network device set). The first network device set and the at least one network device described above (for example, which is recorded as a second network device set) that sends data (or sends the N groups of CRSs) may be a same network device set, or may be different network device sets. When the first network device set and the second network device set are different network device sets, the first network device set includes the second network device set. In other words, the second network device set is a subset of the first network device set. For brevity, a same or similar case is not described below.

It should be further noted herein that when two data antenna ports to which a same codeword is mapped are from a same network device (for example, the second network device), all CRSs sent by the second network device have a same quantity of antenna ports and a same frequency offset. In other words, the first network device may send an index of only one first PQI for the second network device. In other words, the N groups of CRSs are not consistent with a quantity of data antenna ports, and may be equal to or less than the quantity of data antenna ports.

It should be further noted that due to a frequency offset $v_{shift} = N_{ID}^{cell} \mod 6$, a case in which frequency offset values that are obtained after a modulo operation is performed on different cell identifiers are the same is not excluded. If quantities of antenna ports that are used by two network devices to send CRSs are the same, and frequency offsets of the CRSs are the same, in this case, the two network devices are corresponding to one group of CRSs. In other words, only a same first PQI is needed to determine a resource occupied by the CRSs. For ease of understanding and description, unless otherwise specified, a case in which cell identifiers are different but frequency offsets are the same is not considered below. However, it should be understood that this shall not constitute any limitation on this application.

With reference to the scenarios shown in (b) to (d) in FIG. 2, the following describes in detail a method in which indexes of N first PQIs are used for indication. To be specific, N=2.

It should be understood that in the scenario shown in (a) in FIG. 2, a CRS resource indication method is similar to that in the prior art. For brevity, details of a specific process are not described herein.

Then referring to (b) in FIG. 2, (b) in FIG. 2 shows a case in which two layers (which are corresponding to two data antenna ports) of same data are sent by using two different network devices. In other words, a layer 1 is corresponding to an antenna port 1, the antenna port 1 is corresponding to a TP1, a layer 2 is corresponding to an antenna port 2, and the antenna port 2 is corresponding to a TP2. In this case, the first network device sends indexes of two first PQIs to the terminal device. To be specific, a first first PQI is corresponding to the TP1, and a second first PQI is corresponding to the TP2; or a second first PQI is corresponding to the TP1, and a first first PQI is corresponding to the TP2; or a first first PQI is corresponding to the antenna port 1, and a second first PQI is corresponding to the antenna port 2; or a first first PQI is corresponding to the antenna port 2, and a second first PQI is corresponding to the antenna port 1; or a first first PQI is corresponding to the layer 1, and a second first PQI is corresponding to the layer 2; or a first first PQI is corresponding to the layer 2, and a second first PQI is corresponding to the layer 1.

Then referring to (c) in FIG. 2, (c) in FIG. 2 shows a case in which each of two layers (which are corresponding to two data antenna ports) of same data is sent by using two different network devices. In other words, a layer 1 is corresponding to an antenna port 1, the antenna port 1 is corresponding to a TP1 and a TP2, a layer 2 is corresponding to an antenna port 2, and the antenna port 2 is corresponding to the TP1 and the TP2. In this case, the first network device sends indexes of two first PQIs to the terminal device. To be specific, a first first PQI is corresponding to the TP1, and a second first PQI is corresponding to the TP2; or a second first PQI is corresponding to the TP1, and a first first PQI is corresponding to the TP2; or a first first PQI and a second first PQI are corresponding to the antenna port 1, and the first first PQI and the second first PQI are corresponding to the antenna port 2; or a first first PQI and a second first PQI are corresponding to the layer 1, and the first first PQI and the second first PQI are corresponding to the layer 2.

For another example, a layer 1 is corresponding to an antenna port 1, the antenna port 1 is corresponding to a TP1 and a TP2, a layer 2 is corresponding to an antenna port 2, and the antenna port 2 is corresponding to a TP3 and a TP4. In this case, the first network device sends indexes of four first PQIs to the terminal device, and the four first PQIs are respectively corresponding to the TP1, the TP2, the TP3, and the TP4; or a first first PQI and a second first PQI are corresponding to the antenna port 1, and a third first PQI and a fourth first PQI are corresponding to the antenna port 2; or a first first PQI and a second first PQI are corresponding to the layer 1, and a third first PQI and a fourth first PQI are corresponding to the layer 2.

Then referring to (d) in FIG. 2, (d) in FIG. 2 shows a case in which a same layer of same data is encoded by two different network devices in different encoding manners, and is sent by using different antenna ports. In other words, a layer 1 is corresponding to an antenna port 1 and an antenna port 2, the antenna port 1 is corresponding to a TP1, and the antenna port 2 is corresponding to a TP2. In this case, the first network device sends indexes of two first PQIs to the terminal device. A first first PQI is corresponding to the TP1, and a second first PQI is corresponding to the TP2; or a first first PQI and a second first PQI are corresponding to the antenna port 1, the first first PQI and the second first PQI are corresponding to the antenna port 2; or a first first PQI and a second first PQI are corresponding to the layer 1.

In another possible design, an indication field of a TB may be extended in existing DCI. In other words, an indication field of a TB that is defined in an existing protocol carries an index of one PQI (which may be corresponding to the first PQI in this embodiment of this application), and the PQI indicates one group of higher layer parameters. The PQI is extended in this embodiment of this application, so that a plurality of groups of higher layer parameters are indicated by using the PQI (which may be corresponding to the second PQI in this embodiment of this application).

Optionally, the first indication information includes indexes of S second PQIs, and each second PQI includes information about a quantity of antenna ports and a frequency offset of at least one group of CRSs, where $S \in [1, N)$, and S is a natural number; and That the first network device sends the first indication information to the terminal device includes:

sending, by the first network device, the indexes of the S second PQIs to the terminal device.

Correspondingly, that the terminal device receives the first indication information sent by the network device includes:

receiving, by the terminal device, the indexes of the S second PQIs that are sent by the network device; and that the terminal device determines, based on the indication information, the resources that are occupied by the N groups of CRSs includes:

determining, by the terminal device based on a second mapping relationship and the indexes of the S second PQIs, the resources that are occupied by the N groups of CRSs, where the second mapping relationship is used to indicate a mapping relationship between indexes of a plurality of second PQIs and a plurality of higher layer parameter group sets.

In other words, N pieces of information about a quantity of CRS antenna ports and a frequency offset may be indicated by using one second PQI, and in this case, the second PQI may include N indexes of quantities of CRS antenna ports and N indexes of CRS frequency offsets, or N indexes of quantities of CRS antenna ports and frequency offsets.

Alternatively, N pieces of information about a quantity of CRS antenna ports and a frequency offset may be indicated by using a plurality of second PQIs, and in this case, each second PQI may include at least one index of a quantity of CRS antenna ports and at least one index of a CRS frequency offset, or at least one index of a quantity of CRS antenna ports and a frequency offset. At least one group of CRSs corresponding to the at least one piece of CRS configuration information (namely, a quantity of CRS antenna ports and a frequency offset) is a subset of the N groups of CRSs.

It should be understood that a specific method in which the S second PQIs are used to indicate information about the quantities of antenna ports and the frequency offsets of the N groups of CRSs is similar to the specific method in which the N first PQIs are used for indication. For brevity, details are not described herein again.

It may be understood that the REs to which the N groups of CRSs are mapped need to be considered when the network device sends data, and the REs to which the N groups of CRSs are mapped also need to be considered when the terminal device receives data. Therefore, a resource occupation status of each of the N groups of CRSs may not be determined provided that locations of all REs to which the N groups of CRSs are mapped are learned of. For brevity, a same or similar case is not described below.

Method 2:

The first indication information may be information about quantities of CRS antenna ports and CRS frequency offsets that are corresponding to the N groups of CRSs. In other words, the quantity of CRS antenna ports and the CRS frequency offset are directly indicated.

Optionally, the first indication information includes N indexes of quantities of CRS antenna ports corresponding to the N groups of CRSs and N indexes of CRS frequency offsets corresponding to the N groups of CRSs.

That the first network device sends the first indication information to the terminal device includes:

sending, by the first network device, the N indexes of the quantities of CRS antenna ports and the N indexes of the CRS frequency offsets to the terminal device.

Correspondingly, that the terminal device receives the first indication information sent by the network device includes:

receiving, by the terminal device, the N indexes of the quantities of CRS antenna ports and the N indexes of the CRS frequency offsets that are sent by the network device; and that the terminal device determines, based on the indication information, the resources that are occupied by the N groups of CRSs includes:

determining, by the terminal device based on a third mapping relationship, a fourth mapping relationship, the N indexes of the quantities of CRS antenna ports, and the N indexes of the CRS frequency offsets, the resources that are occupied by the N groups of CRSs, where the third mapping relationship is used to indicate a mapping relationship between a plurality of indexes and a plurality of quantities of CRS antenna ports, and the fourth mapping relationship is used to indicate a mapping relationship between a plurality of indexes and a plurality of CRS frequency offsets.

The N indexes of the quantities of CRS antenna ports are one-to-one corresponding to the N groups of CRSs, and the N indexes of the CRS frequency offsets are one-to-one corresponding to the N groups of CRSs. An index of an $i^{th}$ quantity of CRS antenna ports is used to determine a quantity of antenna ports through which an $i^{th}$ group of CRSs are sent, and an index of an $i^{th}$ CRS frequency offset is used to indicate an offset, relative to the preset pilot pattern (for example, the pilot pattern shown in FIG. 3A and FIG. 3B), of an RE that is occupied by the $i^{th}$ group of CRSs in a frequency domain resource, where $i \in [1, N]$, and i is a natural number.

Table 2 shows a mapping relationship (namely, the third mapping relationship) between a plurality of indexes of quantities of CRS antenna ports and a plurality of quantities of antenna ports, and Table 3 shows a mapping relationship (namely, the fourth mapping relationship) between a plurality of indexes of CRS frequency offsets and a plurality of CRS frequency offsets.

TABLE 2

| Index of a quantity of CRS antenna ports | Quantity of CRS antenna ports |
| --- | --- |
| 0 | 0 |
| 1 | 1 |
| 2 | 2 |
| 3 | 4 |

TABLE 3

| Index of a CRS frequency offset | CRS frequency offset |
| --- | --- |
| 0 | 0 |
| 1 | 1 |
| 2 | 2 |
| 3 | 3 |
| 4 | 4 |
| 5 | 5 |

It should be noted herein that it may be learned from the pilot pattern shown in FIG. 3A and FIG. 3B that when a plurality of antenna ports are used to send CRSs at the same time, relative locations of REs to which any two of a plurality of groups of CRSs corresponding to the plurality of antenna ports are mapped are unchanged in an RB. For example, when a quantity of antenna ports is 2, on a first OFDM symbol, an R0 and an R1 are at a distance of two subcarriers in frequency domain. In other words, when a plurality of antenna ports are used to send CRSs at the same time, relative locations of REs to which a plurality of groups of CRSs corresponding to the plurality of antenna ports are mapped meet a preset rule in an RB.

In this embodiment of this application, by indicating the quantity of antenna ports through which the $i^{th}$ group of CRSs are sent, relative locations of CRSs of different antenna ports may be determined in an RB based on the preset rule (namely, the preset pilot pattern).

In addition, after relative locations of CRSs of a plurality of antenna ports are determined in an RB, frequency domain resources that are occupied by the CRSs of the plurality of antenna ports in the RB may be further determined based on frequency offsets.

Pilot patterns of two antenna ports shown in FIG. 3A and FIG. 3B are still used as an example. In a first OFDM symbol, seen from bottom to top, a first CRS corresponding to the R0 and a first CRS corresponding to the R1 form an entirety (for ease of description, which is recorded as a CRS unit). It may be understood that locations to which two groups of CRSs are mapped in an RB may be deduced from a location to which the CRS unit is mapped in the RB.

If a frequency offset is 0, it indicates that a frequency domain resource that is occupied by the CRS unit in the RB is the same as that shown in the pilot pattern; if the frequency offset is 1, it indicates that the frequency domain resource that is occupied by the CRS unit in the RB and that shown in the pilot pattern are at a distance of one subcarrier, in other words, the frequency domain resource moves upward by one subcarrier; and if the frequency offset is 2, it indicates that the frequency domain resource that is occupied by the two groups of CRSs in the RB and that shown in the pilot pattern are at a distance of two subcarriers, in other words, the frequency domain resource moves upward by two subcarriers.

It may be understood that when there is one antenna port, a maximum value of a frequency offset of a CRS (or referred to as a CRS unit, and the CRS unit includes only one CRS) may be 5; or when there are two or four antenna ports, a maximum value of a frequency offset of a CRS unit (the CRS unit may include two or four CRSs) may be 2.

With reference to the scenarios shown in (b) to (d) in FIG. 2, the following describes in detail a method in which N groups of PQIs are used for indication. To be specific, N=2.

Then referring to (b) in FIG. 2, in a case shown in (b) in FIG. 2, the indication information that is sent by the first network device to the terminal device may include indexes of two quantities of CRS antenna ports and indexes of two CRS frequency offsets, which are respectively corresponding to two TPs (or two data antenna ports).

Then referring to (c) in FIG. 2, in a case shown in (c) in FIG. 2, the indication information that is sent by the first network device to the terminal device may include indexes of two quantities of CRS antenna ports and indexes of two CRS frequency offsets, which are respectively corresponding to two TPs.

Then referring to (d) in FIG. 2, in a case shown in (d) in FIG. 2, the indication information that is sent by the first network device to the terminal device may include indexes of two quantities of CRS antenna ports and indexes of two CRS frequency offsets, which are respectively corresponding to two TPs (or two data antenna ports).

It should be understood that N=2 shown in the method 1 and the method 2 is merely an example of this embodiment of this application, and shall not constitute any limitation on this embodiment of this application. That the first network device sends the indication information that is used to determine the resources of the N groups of CRSs to the terminal device shall fall within the protection scope of this application provided that a quantity N of CRS groups that are used by the at least one network device to send data is greater than or equal to 2.

Method 3:

In the method 2, a quantity of CRS antenna ports and a CRS frequency offset are separately indicated, in other words, two indexes are used to separately indicate a quantity of CRS antenna ports and a CRS frequency offset. Different from the method 2, in the method 3, a quantity of CRS antenna ports and a CRS frequency offset are jointly indicated, in other words, one index is used to indicate a quantity of CRS antenna ports and a CRS frequency offset.

Optionally, the first indication information includes N indexes of quantities of CRS antenna ports and frequency offsets that are corresponding to the N groups of CRSs.

That the first network device sends the first indication information to the terminal device includes:

sending, by the first network device, the N indexes of the quantities of CRS antenna ports and the frequency offsets to the terminal device.

Correspondingly, that the terminal device receives the first indication information sent by the network device includes:

receiving, by the terminal device, the N indexes of the quantities of CRS antenna ports and the frequency offsets that are sent by the network device; and that the terminal device determines, based on the indication information, the resources that are occupied by the N groups of CRSs includes:

determining, by the terminal device based on a fifth mapping relationship and the N indexes of the quantities of CRS antenna ports and the frequency offsets, the resources that are occupied by the N groups of CRSs, where the fifth mapping relationship is used to indicate a mapping relationship between a plurality of indexes and a plurality of pieces of information about a quantity of CRS antenna ports and a frequency offset.

An $i^{th}$ index of a quantity of CRS antenna ports and a frequency offset is used to indicate a quantity of antenna ports through which an $i^{th}$ group of CRSs are sent and a location of an RE to which the $i^{th}$ group of CRSs are mapped in a frequency domain resource, where $i \in [1, N]$, and i is a natural number.

Table 4 shows a mapping relationship (namely, the fifth mapping relationship) between a plurality of indexes of quantities of CRS antenna ports and frequency offsets and a plurality of groups of quantities of CRS antenna ports and frequency offsets.

TABLE 4

| Index | Quantity of CRS antenna ports | CRS frequency offset |
|---|---|---|
| 0 | 0 | / |
| 1 | 1 | 0 |
| 2 | 1 | 1 |
| 3 | 1 | 2 |
| 4 | 1 | 5 |
| 5 | 1 | 4 |
| 6 | 1 | 5 |
| 7 | 2 | 0 |
| 8 | 2 | 1 |
| 9 | 2 | 2 |
| 10 | 4 | 0 |
| 11 | 4 | 1 |
| 12 | 4 | 2 |

It may be learned that both a quantity of antenna ports through which a CRS is sent and a frequency offset may be determined based on an index of a quantity of CRS antenna ports and a frequency offset. For example, when an index of a quantity of CRS antenna ports and a frequency offset of the $i^{th}$ group of CRSs is 1-6, a quantity of antenna ports that are used to send the $i^{th}$ group of CRSs is 1, and frequency offsets are respectively 0-5; when the index of a quantity of CRS antenna ports and a frequency offset of the $i^{th}$ group of CRSs is 7-9, the quantity of antenna ports that are used to send the $i^{th}$ group of CRSs is 2, and frequency offsets are respectively 0-2; and when the index of a quantity of CRS antenna ports and a frequency offset of the $i^{th}$ group of CRSs is 10-11, the quantity of antenna ports that are used to send the $i^{th}$ group of CRSs is 4, and frequency offsets respectively are 0-2.

Method 4:

The first indication information includes an index of configuration information, and the configuration information indicates an index of a quantity of antenna ports and a frequency offset of each of the N groups of CRSs.

That the network device sends the first indication information to the terminal device includes:

sending, by the network device, the index of the configuration information to the terminal device.

Correspondingly, that the terminal device receives the first indication information sent by the network device includes:

receiving, by the terminal device, the index of the configuration information that is sent by the network device; and that the terminal device determines, based on the indication information, the resources that are occupied by the N groups of CRSs includes:

determining, by the terminal device based on a sixth mapping relationship and the index of the configuration information, the resources that are occupied by the N groups of CRSs, where the sixth mapping relationship is used to indicate a mapping relationship between a plurality of indexes of configuration information and indexes of quantities of antenna ports and frequency offsets of a plurality of groups of CRSs, or the sixth mapping relationship is used to indicate a mapping relationship between a plurality of indexes of configuration information and indexes of a plurality of groups of PQIs.

The configuration information includes a mapping relationship between a quantity of antenna ports (namely, data antenna ports) that are used to send data, a quantity of CRS antenna ports, and a frequency offset, or a mapping relationship between a layer through which data is sent, a quantity of CRS antenna ports, and a frequency offset, or a mapping relationship between a quantity of antenna ports that are used to send data, a layer through which data is sent, a quantity of CRS antenna ports, and a frequency offset.

In this embodiment of this application, for specific content that is included in the configuration information, a plurality of groups of possible parameter sets included in the configuration information may be configured in RRC signaling that is transmitted on a PDSCH, or the network device and the terminal device may pre-negotiate and store the plurality of groups of possible parameter sets included in the configuration information. In PDCCH transmission, DCI is sent on a PDCCH. An index of configuration information in the DCI is used to indicate which group of parameter sets is currently used by the terminal device for data transmission.

Therefore, in the method 4, one index of configuration information may be used for indication regardless of whether there is one or more antenna ports that are used to send data and whether there is one or more network devices, in other words, regardless of whether N is 1 or a natural number greater than 1. The index of the configuration information is used to indicate information about quantities of CRS antenna ports and frequency offsets that are corresponding to the N groups of CRSs.

Table 5 shows a mapping relationship (namely, an example of the sixth mapping relationship) between a plurality of indexes of configuration information and resources of a plurality of groups of CRSs.

TABLE 5

| Index of configuration information | Information about a data antenna port and a frequency offset corresponding to each layer (or a quantity of data ports or a codeword) |
|---|---|
| 0 | Layer 1, a quantity of CRS antenna ports = 4, and a frequency offset = 0; |

TABLE 5-continued

| Index of configuration information | Information about a data antenna port and a frequency offset corresponding to each layer (or a quantity of data ports or a codeword) |
|---|---|
|  | Layer 2, a quantity of CRS antenna ports = 4, and a frequency offset = 1; |
| 1 | Layer 1, a quantity of CRS antenna ports = 4, and a frequency offset = 0; |
|  | Layer 2, a quantity of CRS antenna ports = 4, and a frequency offset = 2; |
| 2 | Layer 1, a quantity of CRS antenna ports = 4, and a frequency offset = 1; |
|  | Layer 2, a quantity of CRS antenna ports = 4, and a frequency offset = 2; |
| 3 | Layer 1, a quantity of CRS antenna ports = 2, and a frequency offset = 0; |
|  | Layer 2, a quantity of CRS antenna ports = 4, and a frequency offset = 1; |
| 4 | Layer 1, a quantity of CRS antenna ports = 2, and a frequency offset = 1; |
|  | Layer 2, a quantity of CRS antenna ports = 4, and a frequency offset = 2; |
| 5 | Layer 1, a quantity of CRS antenna ports = 2, and a frequency offset = 0; |
|  | Layer 2, a quantity of CRS antenna ports = 2, and a frequency offset = 1; |
| 6 | Layer 1, a quantity of CRS antenna ports = 4, and a frequency offset = 0; |
|  | Layer 2, a quantity of CRS antenna ports = 4, and a frequency offset = 1; |
|  | Layer 3, a quantity of CRS antenna ports = 4, and a frequency offset = 2; |
| 7 | Layer 1, a quantity of CRS antenna ports = 2, and a frequency offset = 0; |
|  | Layer 2, a quantity of CRS antenna ports = 2, and a frequency offset = 1; |
|  | Layer 3, a quantity of CRS antenna ports = 2, and a frequency offset = 2. |

It may be learned that when the network device maps one codeword to a plurality of layers (or one codeword is sent by using a plurality of data antenna ports), the first network device may send information about a quantity of CRS antenna ports and a frequency offset corresponding to each layer (or each data antenna port) to the terminal device in a form of information about a quantity of CRS antenna ports and a frequency offset. The terminal device may determine, based on the information about the quantity of CRS antenna ports and the frequency offset corresponding to each layer, a resource occupied by a CRS, and further prohibits data receiving in the corresponding resource.

Further, the information about the quantity of CRS antenna ports and the frequency offset may be indicated by using an index of the quantity of CRS antenna ports and the frequency offset. In other words, the sixth mapping relationship may be further transformed into a mapping relationship between a plurality of indexes of configuration information and indexes of quantities of antenna ports and frequency offsets of a plurality of groups of CRSs (which are referred to as CRSs for short below).

Table 6 shows a mapping relationship (namely, another example of the sixth mapping relationship) between a plurality of indexes of configuration information and indexes of a plurality of groups of CRSs.

TABLE 6

| Index of configuration information | Index of a CRS corresponding to each layer (or a data antenna port or a codeword) |
|---|---|
| 0 | Layer 1, and an index of a CRS = 10; |
|  | Layer 2, and an index of a CRS = 11; |

TABLE 6-continued

| Index of configuration information | Index of a CRS corresponding to each layer (or a data antenna port or a codeword) |
|---|---|
| 1 | Layer 1, and an index of a CRS = 10; Layer 2, and an index of a CRS = 12; |
| 2 | Layer 1, and an index of a CRS = 11; Layer 2, and an index of a CRS = 12; |
| 3 | Layer 1, and an index of a CRS = 7; Layer 2, and an index of a CRS = 11; |
| 4 | Layer 1, and an index of a CRS = 8; Layer 2, and an index of a CRS = 12; |
| 5 | Layer 1, and an index of a CRS = 7; Layer 2, and an index of a CRS = 8; |
| 6 | Layer 1, and an index of a CRS = 10; Layer 2, and an index of a CRS = 11; Layer 3, and an index of a CRS = 12; |
| 7 | Layer 1, and an index of a CRS = 7; Layer 2, and an index of a CRS = 8; Layer 3, and an index of a CRS = 9. |

For an index of a CRS, refer to the mapping relationship between indexes of a plurality of groups of CRSs and a plurality of quantities of CRS antenna ports and frequency offsets shown in Table 4, in other words, Table 6 is established on the basis of Table 4. In other words, if the foregoing method is used to instruct the terminal device to determine a resource of a CRS, information about the foregoing two mapping relationships needs to be stored or obtained (namely, the mapping relationship between a plurality of indexes of quantities of CRS antenna ports and frequency offsets and a plurality of groups of quantities of CRS antenna ports and frequency offsets, and the mapping relationship between a plurality of indexes of configuration information and indexes of a plurality of groups of CRSs).

Referring to Table 6, for example, when the index of the configuration information is 0, it indicates that the data is transmitted by using two layers. Information about a quantity of CRS antenna ports and a frequency offset corresponding to a layer 1 is corresponding to a case in which an index of a quantity of CRS antenna ports and a frequency offset is 10 in Table 4. In other words, CRSs are sent through four antenna ports, and a frequency offset of a unit including the CRSs corresponding to the four antenna ports is 0. This may be corresponding to a pilot pattern when a quantity of antenna ports is 4 in FIG. 3A and FIG. 3B. Information about a quantity of CRS antenna ports and a frequency offset corresponding to a layer 2 is corresponding to a case in which an index of a quantity of CRS antenna ports and a frequency offset is 11 in Table 4. In other words, CRSs are sent through four antenna ports, and a frequency offset of a unit including the CRSs corresponding to the four antenna ports is 1. This may be corresponding to a pilot pattern with an offset of one subcarrier upward when a quantity of antenna ports is 4 in FIG. 3A and FIG. 3B. By analogy, and for brevity, indexes in Table 6 are not described in detail herein.

Optionally, the information about the quantity of CRS antenna ports and the CRS frequency offset may be indicated by using a first PQI.

In a possible design, indication fields of an antenna port, a scrambling identity, and a quantity of layers (Antenna port (s), scrambling identity and a quantity of layers) may be extended in DCI defined in an existing protocol. In other words, the indication fields of the antenna port, the scrambling identity, and the quantity of layers that are defined in the existing protocol are extended, to add an indication field of the first PQI. In this embodiment of this application, the index of the configuration information is used to indicate that the resources of the N groups of CRSs that are currently used for data transmission are which one of the foregoing plurality of groups of parameter sets (including an antenna port, a scrambling identity, a quantity of layers, and a first PQI).

Table 7 shows a mapping relationship (namely, still another example of the sixth mapping relationship) between a plurality of indexes of configuration information and a plurality of groups of parameter sets that may be configured by using indication fields of an antenna port, a scrambling identity, a quantity of layers, and a first PQI.

TABLE 7

| Index of configuration information | Antenna port, scrambling identity, a quantity of layers, and first PQI |
|---|---|
| 0 | One layer, a port 7, a scrambling identity = 0, and a PQI = 0, 1; |
| 1 | One layer, a port 7, a scrambling identity = 1, and a PQI = 0, 1; |
| 2 | One layer, a port 7, a scrambling identity = 0, and a PQI = 1, 2; |
| 3 | One layer, a port 7, a scrambling identity = 1, and a PQI = 1, 2; |
| 4 | Two layers, ports 7 and 8, and a PQI = 0, 1; |
| 5 | Two layers, ports 7 and 8, and a PQI = 0, 1; |
| 6 | Two layers, ports 7 and 8, and a PQI = 1, 2; |
| 7 | Two layers, ports 7 and 8, and a PQI = 1, 2; |
| 8 | One layer, a port 7, a scrambling identity = 0, and a PQI = 0, 2; |
| 9 | One layer, a port 7, a scrambling identity = 1, and a PQI = 0, 2; |
| 10 | One layer, a port 7, a scrambling identity = 0, and a PQI = 1, 3; |
| 11 | One layer, a port 7, a scrambling identity = 1, and a PQI = 1, 3; |
| 12 | Two layers, ports 7 and 8, and a PQI = 0, 2; |
| 13 | Two layers, ports 7 and 8, and a PQI = 0, 2; |
| 14 | Two layers, ports 7 and 8, and a PQI = 1, 3; |
| 15 | Two layers, ports 7 and 8, and a PQI = 1, 3. |

For an index of a PQI, refer to the mapping relationship between indexes of a plurality of groups of PQIs and indexes of a plurality of groups of higher layer parameters shown in Table 1, and quantities of CRS antenna ports and frequency offsets of the N groups of CRSs are further determined based on a corresponding higher layer parameter, in other words, Table 7 is established on the basis of Table 1. In other words, if the foregoing method is used to instruct the terminal device to determine a resource of a CRS, information about the foregoing two mapping relationships needs to be stored or obtained (namely, the mapping relationship between indexes of a plurality of groups of PQIs and indexes of a plurality of groups of higher layer parameters, and the mapping relationship between a plurality of indexes of configuration information and a plurality of groups of parameter sets that may be configured by using indication fields of an antenna port, a scrambling identity, a quantity of layers, and a first PQI).

In another possible design, a new indication field may be added to DCI that is defined in an existing protocol, for example, may be an indication field of a PQI. The indication field of the PQI is used to indicate a mapping relationship between a quantity of antenna ports and a first PQI, a mapping relationship between a layer and a first PQI, or a mapping relationship between a quantity of antenna ports, a layer, and a first PQI. In this embodiment of this application, the index of the configuration information is used to indicate that the resources of the N groups of CRSs that are currently used for data transmission are which one of the foregoing plurality of groups of parameter sets (including a data antenna port (or a DMRS antenna port) and a first PQI, or a layer and a first PQI, or a data antenna port, a layer, and a first PQI).

Table 8, Table 9, and Table 10 show a mapping relationship (namely, yet another example of the sixth mapping relationship) between a plurality of indexes of configuration information and a plurality of groups of parameter sets that may be configured by using an indication field of a PQI.

TABLE 8

| Index of configuration information | Layer and first PQI |
|---|---|
| 0 | Layer 1, and a PQI = 0, 1; |
| 2 | Layer 1, and a PQI = 1, 2; |
| 4 | Layer 1, and a PQI = 0, 1; Layer 2, and a PQI = 2, 3; |
| 5 | Layer 1, and a PQI = 0, 3; Layer 2, and a PQI = 1, 2; |
| 6 | Layer 1, and a PQI = 0, 2; Layer 2, and a PQI = 0, 2; |
| 7 | A quantity of layers is greater than 2, and a PQI = 0, 1; |
| 8 | Layer 1, and a PQI = 0, 2; |
| 10 | Layer 1, and a PQI = 1, 3; |
| 12 | Layer 1, and a PQI = 0, 2; Layer 2, and a PQI = 1, 3; |
| 13 | Layer 1, and a PQI = 0, 1; Layer 2, and a PQI = 0, 1; |
| 14 | Layer 1, and a PQI = 0, 3; Layer 2, and a PQI = 0, 3; |
| 15 | A quantity of layers is greater than 2, and a PQI = 2, 3. |

TABLE 9

| Index of configuration information | Port number and first PQI |
|---|---|
| 0 | Port 7, and a PQI = 0, 1; |
| 2 | Port 7, and a PQI = 1, 2; |
| 4 | Port 7, and a PQI = 0, 1; Port 8, and a PQI = 2, 3; |
| 5 | Port 7, and a PQI = 0, 3; Port 8, and a PQI = 1, 2; |
| 6 | Port 7, and a PQI = 0, 2; Port 8, and a PQI = 0, 2; |
| 7 | A quantity of ports is greater than 2, and a PQI = 0, 1; |
| 8 | Port 7, and a PQI = 0, 2; |
| 10 | Port 7, and a PQI = 1, 3; |
| 12 | Port 7, and a PQI = 0, 2; Port 8, and a PQI = 1, 3; |
| 13 | Port 7, and a PQI = 0, 1; Port 8, and a PQI = 0, 1; |
| 14 | Port 7, and a PQI = 0, 3; Port 8, and a PQI = 0, 3; |
| 15 | A quantity of ports is greater than 2, and a PQI = 2, 3. |

TABLE 10

| Index of configuration information | Codeword and first PQI |
|---|---|
| 0 | Codeword 1, and a PQI = 0, 1; |
| 2 | Codeword 1, and a PQI = 1, 2; |
| 4 | Codeword 1, and a PQI = 0, 1; Codeword 2, and a PQI = 2, 3; |
| 5 | Codeword 1, and a PQI = 0, 3; Codeword 2, and a PQI = 1, 2; |
| 6 | Codeword 1, and a PQI = 0, 2; Codeword 2, and a PQI = 0, 2; |
| 7 | A quantity of codewords is greater than 2, and a PQI = 0, 1; |
| 8 | Codeword 1, and a PQI = 0, 2; |
| 10 | Codeword 1, and a PQI = 1, 3; |
| 12 | Codeword 1, and a PQI = 0, 2; Codeword 2, and a PQI = 1, 3; |
| 13 | Codeword 1, and a PQI = 0, 1; Codeword 2, and a PQI = 0, 1; |
| 14 | Codeword 1, and a PQI = 0, 3; Codeword 2, and a PQI = 0, 3; |
| 15 | A quantity of codewords is greater than 2, and a PQI = 2, 3. |

For an index of a PQI, refer to the mapping relationship between indexes of a plurality of groups of PQIs and indexes of a plurality of groups of higher layer parameters shown in Table 1, and quantities of CRS antenna ports and frequency offsets of the N groups of CRSs are further determined based on a corresponding higher layer parameter, in other words, Table 8, Table 9, and Table 10 are established on the basis of Table 1. In other words, if the foregoing method is used to instruct the terminal device to determine a resource of a CRS, corresponding mapping relationship information needs to be stored or obtained. A specific processing method is described above in detail, and for brevity, details are not described herein again.

Optionally, the indication information includes a cell identifier of at least one target cell, or at least one index corresponding to the cell identifier and information about a quantity of antenna ports of the at least one target cell.

The following describes in detail a method in which an index of a cell identifier of at least one cell (a method 5) or at least one index corresponding to the cell identifier and antenna port configuration information of the at least one cell (a method 6) is used to indicate a resource of a CRS.

Method 5:

Optionally, the indication information includes an index of a cell identifier of at least one target cell and information about a quantity of antenna ports of the at least one target cell.

That the first network device sends the indication information to the terminal device includes:

determining, by the first network device, the at least one target cell corresponding to the at least one network device that sends the data to the terminal device, where the at least one target cell is determined from a plurality of coordinated cells, and the plurality of coordinated cells are corresponding to a plurality of network devices that may be configured to send data to the terminal device; and sending, by the first network device, the cell identifier of the at least one target cell and the information about the quantity of antenna ports of the at least one target cell to the terminal device.

Correspondingly, that the terminal device receives the indication information sent by the network device includes:

receiving, by the terminal device, an index of the cell identifier of the at least one target cell and the information about the quantity of antenna ports of the at least one target cell that are sent by the network device; and that the terminal device determines, based on the indication information, the resources that are occupied by the N groups of CRSs includes:

determining, by the terminal device based on a seventh mapping relationship, the index of the cell identifier of the at least one target cell, and the information about the quantity of antenna ports of the at least one target cell, the resources that are occupied by the N groups of CRSs, where the seventh mapping relationship is used to indicate a mapping relationship between indexes of a plurality of cell identifiers and cell identifiers of a plurality of cells.

In this embodiment of this application, the first network device may configure antenna port configuration information of a plurality of coordinated cells by using RRC signaling, or the terminal device may prestore the antenna port configuration information of the plurality of coordinated cells. The coordinated cell described herein may be understood as a cell corresponding to a network device that may be configured to send data to the terminal device (namely, for CoMP transmission).

After receiving the cell identifier of the target cell that is sent by the first network device, the terminal device may determine the quantity of antenna ports of the target cell based on the information about the quantity of antenna ports of the target cell that is sent by the first network device, and calculate a frequency offset according to $v_{shift}=N_{ID}^{cell} \mod 6$, to determine quantities of antenna ports and frequency offsets that are corresponding to the N groups of CRSs.

Method 6:

Optionally, the indication information includes at least one index corresponding to antenna port configuration information of at least one target cell, and the CRS antenna port configuration information includes a cell identifier and a corresponding quantity of CRS antenna ports, or a quantity of CRS antenna ports of the cell and a CRS frequency offset of the cell, or a cell identifier, a corresponding quantity of CRS antenna ports, and a corresponding CRS frequency offset.

That the first network device sends the indication information to the terminal device includes:

determining, by the first network device, the at least one target cell corresponding to the at least one network device that sends the data to the terminal device and a quantity of antenna ports of each target cell, where the at least one target cell is determined from a plurality of coordinated cells, and the plurality of coordinated cells are corresponding to a plurality of network devices that may be configured to send data to the terminal device; and sending, by the first network device, the at least one index corresponding to the antenna port configuration information of the at least one target cell to the terminal device.

Correspondingly, that the terminal device receives the indication information sent by the network device includes:

receiving, by the terminal device, the at least one index corresponding to the antenna port configuration information of the at least one cell that is sent by the network device; and receiving, by the terminal device, an index of the at least one cell identifier that is sent by the network device; and that the terminal device determines, based on the indication information, the resources that are occupied by the N groups of CRSs includes:

determining, by the terminal device based on an eighth mapping relationship and the at least one index corresponding to the antenna port configuration information of the at least one cell, the resources that are occupied by the N groups of CRSs, where the eighth mapping relationship is used to indicate a mapping relationship between a plurality of indexes and CRS antenna port configuration information of a plurality of coordinated cells.

In this embodiment of this application, the first network device may configure the mapping relationship between a plurality of indexes and CRS antenna port configuration information of a plurality of coordinated cells by using RRC signaling, or the terminal device may prestore a mapping relationship between cell identifiers and antenna port configuration information of the plurality of coordinated cells and a plurality of indexes.

When the CRS antenna port configuration information indicates a cell identifier and a corresponding quantity of CRS antenna ports, the first network device may directly send, to the terminal device in an index form, CRS antenna port configuration information of a target cell that currently transmits data. The terminal device may determine, based on a mapping relationship between a cell identifier and a quantity of CRS antenna ports that is obtained in advance, a cell identifier of a cell corresponding to a received index and a quantity of antenna ell ports of the cell, and calculate a frequency offset according to $v_{shift}=N_{ID}^{cell} \mod 6$, to determine quantities of antenna ports and frequency offsets that are corresponding to the N groups of CRSs.

Table 11, Table 12, and Table 13 show a mapping relationship (namely, the eighth mapping relationship) between a plurality of indexes and antenna port configuration information of a plurality of coordinated cells.

TABLE 11

| Index | Index of a coordinated cell corresponding to a layer |
|---|---|
| 0 | Layer 1, and a coordinated cell ID = 0, 1; |
| 2 | Layer 1, and a coordinated cell ID = 1, 2; |
| 4 | Layer 1, and a coordinated cell ID = 0, 1; Layer 2, and a coordinated cell ID = 2, 3; |
| 5 | Layer 1, and a coordinated cell ID = 0, 3; Layer 2, and a coordinated cell ID = 1, 2; |
| 6 | Layer 1, and a coordinated cell ID = 0, 2; Layer 2, and a coordinated cell ID = 1, 2; |
| 7 | A quantity of layers is greater than 2, and a coordinated cell ID = 0, 1; |
| 8 | Layer 1, and a coordinated cell ID = 0, 2; |
| 10 | Layer 1, and a coordinated cell ID = 1, 3; |
| 12 | Layer 1, and a coordinated cell ID = 0, 2; Layer 2, and a coordinated cell ID = 1, 3; |
| 13 | Layer 1, and a coordinated cell ID = 0, 1; Layer 2, and a coordinated cell ID = 0, 1; |
| 14 | Layer 1, and a coordinated cell ID = 0, 3; Layer 2, and a coordinated cell ID = 0, 3; |
| 15 | A quantity of layers is greater than 2, and a coordinated cell ID = 2, 3. |

TABLE 12

| Index | Index of a coordinated cell corresponding to a port |
|---|---|
| 0 | Port 7, and a coordinated cell ID = 0, 1; |
| 2 | Port 7, and a coordinated cell ID = 1, 2; |
| 4 | Port 7, and a coordinated cell ID = 0, 1; Port 8, and a coordinated cell ID = 2, 3; |
| 5 | Port 7, and a coordinated cell ID = 0, 3; Port 8, and a coordinated cell ID = 1, 2; |
| 6 | Port 7, and a coordinated cell ID = 0, 2; Port 8, and a coordinated cell ID = 0, 2; |
| 7 | A quantity of ports is greater than 2, and a coordinated cell ID = 0, 1; |
| 8 | Port 7, and a coordinated cell ID = 0, 2; |
| 10 | Port 7, and a coordinated cell ID = 1, 3; |
| 12 | Port 7, and a coordinated cell ID = 0, 2; Port 8, and a coordinated cell ID = 1, 3; |

TABLE 12-continued

| Index | Index of a coordinated cell corresponding to a port |
|---|---|
| 13 | Port 7, and a coordinated cell ID = 0, 1; Port 8, and a coordinated cell ID = 0, 1; |
| 14 | Port 7, and a coordinated cell ID = 0, 3; Port 8, and a coordinated cell ID = 0, 3; |
| 15 | A quantity of ports is greater than 2, and a coordinated cell ID = 2, 3. |

TABLE 13

| Index | Index of a coordinated cell corresponding to a codeword |
|---|---|
| 0 | Codeword 1, and a coordinated cell ID = 0, 1; |
| 2 | Codeword 1, and a coordinated cell ID = 1, 2; |
| 4 | Codeword 1, and a coordinated cell ID = 0, 1; Codeword 2, and a coordinated cell ID = 2, 3; |
| 5 | Codeword 1, and a coordinated cell ID = 0, 3; Codeword 2, and a coordinated cell ID = 1, 2; |
| 6 | Codeword 1, and a coordinated cell ID = 0, 2; Codeword 2, and a coordinated cell ID = 1, 2; |
| 7 | A quantity of codewords is greater than 2, and a coordinated cell ID = 0, 1; |
| 8 | Codeword 1, and a coordinated cell ID = 0, 2; |
| 10 | Codeword 1, and a coordinated cell ID = 1, 3; |
| 12 | Codeword 1, and a coordinated cell ID = 0, 2; Codeword 2, and a coordinated cell ID = 1, 3; |
| 13 | Codeword 1, and a coordinated cell ID = 0, 1; Codeword 2, and a coordinated cell ID = 0, 1; |
| 14 | Codeword 1, and a coordinated cell ID = 0, 3; Codeword 2, and a coordinated cell ID = 0, 3; |
| 15 | A quantity of codewords is greater than 2, and a coordinated cell ID = 2, 3. |

The coordinated cell ID may be understood as an index of a mapping relationship between a cell identifier and a quantity of CRS antenna ports. It may be learned that after receiving the indication information sent by the first network device, the terminal device may determine, based on an index, a coordinated cell ID corresponding to each layer or each antenna port, further determine a quantity of antenna ports of a target cell based on a mapping relationship between a coordinated cell and antenna port configuration information, and calculate cell a frequency offset according to $v_{shift}=N_{ID}^{cell} \mod 6$, to determine the quantities of antenna ports and the frequency offsets that are corresponding to the N groups of CRSs.

When the antenna port configuration information indicates a quantity of CRS antenna ports of a cell and a CRS frequency offset of the cell, the first network device may directly send, to the terminal device in an index form, CRS antenna port configuration information of a target cell that currently transmits data. The terminal device may determine, based on a mapping relationship between a quantity of CRS antenna ports and a CRS frequency offset that is obtained in advance, a quantity of CRS antenna ports and a CRS frequency offset of a cell corresponding to a received index, to determine the quantities of antenna ports and the frequency offsets that are corresponding to the N groups of CRSs.

In this case, the foregoing coordinated cell ID in Table 11, Table 12, and Table 13 may be understood as an index of a mapping relationship between a quantity of CRS antenna ports and a CRS frequency offset.

When the antenna port configuration information indicates a cell identifier, a corresponding quantity of CRS antenna ports, and a corresponding CRS frequency offset, the first network device may directly send, to the terminal device in an index form, CRS antenna port configuration information of a target cell that currently transmits data. The terminal device may determine, based on a mapping relationship between a cell identifier, a quantity of CRS antenna ports, and a CRS frequency offset that is obtained in advance, a quantity of CRS antenna ports and a CRS frequency offset of a cell corresponding to a received index, to determine the quantities of antenna ports and the frequency offsets that are corresponding to the N groups of CRSs.

In this case, the foregoing coordinated cell ID in Table 11, Table 12, and Table 13 may be understood as an index of a mapping relationship between a cell identifier, a quantity of CRS antenna ports, and a CRS frequency offset.

The foregoing describes in detail, by using the method 1 to the method 6, a specific method in which the first network device instructs, by using the indication information, the terminal device to determine the resources that are occupied by the N groups of CRSs. It should be understood that the methods shown above are merely examples for description, and shall not constitute any limitation on this application, and this application is not limited thereto. It shall fall within the protection scope of this application provided that the first network device sends indication information that is used to indicate a CRS resource to the terminal device, so that the terminal device determines the CRS resource based on the indication information, and receives data based on the CRS resource.

Therefore, in the data transmission method of this embodiment of this application, the indication information is sent to the terminal device, so that the terminal device determines the resources that are occupied by the N groups of CRSs. Therefore, the terminal device may consider CRS resources of all network devices when receiving data, to correctly receive data, and improve receiving performance.

It should be understood that the mapping relationship tables shown above are merely examples for description, and shall not constitute any limitation on this application. It may be understood that all the mapping relationships shown above include an index corresponding to the N groups of CRSs (for example, an index of a first PQI, an index of a second PQI, an index of a quantity of CRS antenna ports, an index of a CRS frequency offset, an index of a quantity of CRS antenna ports and a frequency offset, an index of configuration information, an index of a cell identifier, and an index of antenna port configuration information of a cell).

With reference to FIG. 2 to FIG. 4, the foregoing describes in detail the data transmission method of the embodiments of this application, and the following describes in detail a data transmission apparatus of the embodiments of this application with reference to FIG. 5 to FIG. 8.

Figure 5:
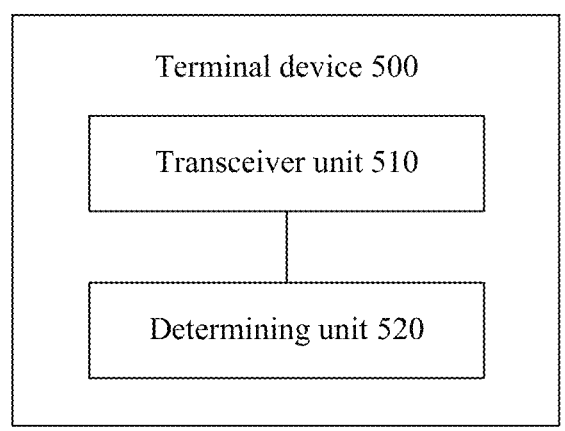
FIG. 5 is a schematic block diagram of a terminal device according to an embodiment of this application.

FIG. 5 is a schematic block diagram of a terminal device 500 according to an embodiment of this application. As shown in FIG. 5, the terminal device 500 includes a transceiver unit 510 and a determining unit 520.

The transceiver unit 510 is configured to receive indication information sent by a network device, where the indication information is used to determine resources occupied by N groups of cell-specific reference signals CRSs, and N is a natural number greater than or equal to 2.

The determining unit 520 is configured to determine, based on the indication information, the resources that are occupied by the N groups of CRSs.

The transceiver unit 510 is further configured to receive data based on the resources that are occupied by the N groups of CRSs.

Optionally, the indication information is corresponding to at least one of the following items: a codeword corresponding to the data, a layer to which the codeword is mapped, or an antenna port to which the codeword is mapped.

Optionally, the transceiver unit 510 is specifically configured to receive first indication information sent by the network device, where the first indication information indicates quantities of antenna ports and frequency offsets of the N groups of CRSs, and the frequency offset indicates a location of a resource element RE to which the CRS is mapped in a frequency domain resource.

Optionally, the transceiver unit 510 is specifically configured to receive indexes of N first PQIs that are sent by the network device and that are corresponding to the N groups of CRSs, and each first PQI includes information about a quantity of antenna ports and a frequency offset for sending one CRS.

Optionally, the transceiver unit 510 is specifically configured to receive indexes of S second PQIs that are sent by the network device and that are corresponding to the N groups of CRSs, and each second PQI includes information about a quantity of antenna ports and a frequency offset of the at least one group of CRSs, where S∈[1, N), and S is a natural number.

Optionally, the first indication information is an index of one second PQI corresponding to the N groups of CRSs, and the second PQI includes information about the quantities of antenna ports and the frequency offsets of the N groups of CRSs.

Optionally, the index of the second PQI is used to indicate a physical downlink shared channel resource element mapping and quasi-co-location configuration PDSCH-RE-mapping-QCL-Config parameter set currently used by the terminal device for data transmission.

Optionally, the PDSCH-RE-mapping-QCL-Config parameter set is carried in radio resource control RRC signaling.

Optionally, the second PQI is a higher layer parameter.

Optionally, the transceiver unit 510 is specifically configured to receive N indexes of quantities of CRS antenna ports that are sent by the network device and that are corresponding to the N groups of CRSs, and N indexes of CRS frequency offsets that are sent by the network device and that are corresponding to the N groups of CRSs.

Optionally, the transceiver unit 510 is specifically configured to receive N indexes of quantities of CRS antenna ports and frequency offsets that are sent by the network device and that are corresponding to the N groups of CRSs.

Optionally, the transceiver unit 510 is specifically configured to receive an index of configuration information that is sent by the network device, and the configuration information includes an index of a quantity of antenna ports and a frequency offset of each of the N groups of CRSs.

Optionally, the transceiver unit 510 is specifically configured to receive an index of a cell identifier of at least one cell and information about a quantity of CRS antenna ports of the at least one cell that are sent by the network device, the cell identifier is used to determine a CRS frequency offset, and the CRS frequency offset indicates a location of an RE to which the CRS is mapped in a frequency domain resource.

Optionally, the transceiver unit 510 is specifically configured to receive at least one index corresponding to CRS antenna port configuration information of at least one cell that is sent by the network device, and the CRS antenna port configuration information includes a cell identifier and a corresponding quantity of CRS antenna ports, or a quantity of CRS antenna ports of the cell and a CRS frequency offset of the cell, or a cell identifier, a corresponding quantity of CRS antenna ports, and a corresponding CRS frequency offset.

Optionally, the transceiver unit 510 is specifically configured to receive downlink control information DCI that is sent by the network device, where the DCI includes the indication information.

Optionally, a part of the resources that are occupied by the N groups of cell-specific reference signals CRSs is corresponding to a resource occupied by a CRS corresponding to one codeword.

The terminal device 500 in this embodiment of this application may be corresponding to the terminal device in the data transmission method of the embodiment of this application, and the modules in the terminal device 500 and the foregoing other operations and/or functions are respectively used to implement corresponding procedures of the method in FIG. 4. For brevity, details are not described herein again.

Therefore, in this embodiment of this application, the terminal device receives the indication information sent by the network device, and determines, based on the indication information, the resources that are occupied by the N groups of CRSs, so that the terminal device may consider CRS resources of all network devices when receiving data, to correctly receive data, and improve receiving performance.

Figure 6:
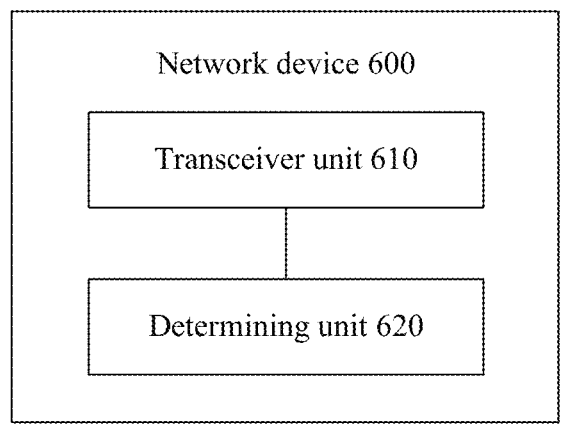
FIG. 6 is a schematic block diagram of a network device according to an embodiment of this application.

FIG. 6 is a schematic block diagram of a network device 600 according to an embodiment of this application. As shown in FIG. 6, the terminal device 600 includes a transceiver unit 610.

The transceiver unit 610 is configured to send indication information to a terminal device, where the indication information is used to determine resources that are occupied by N groups of CRSs, the resources that are occupied by the N groups of CRSs are used to instruct the terminal device to receive data, and N is a natural number greater than or equal to 2.

Optionally, the indication information is corresponding to at least one of the following items: a codeword corresponding to the data, a layer to which the codeword is mapped, or an antenna port to which the codeword is mapped.

Optionally, the network device further includes a determining unit 620, configured to determine quantities of antenna ports and frequency offsets for sending the N groups of CRSs.

The transceiver unit 610 is specifically configured to send, to the terminal device based on the quantities of antenna ports and the frequency offsets of the N groups of CRSs, first indication information that is used to indicate the quantities of antenna ports and the frequency offsets of the N groups of CRSs, and the frequency offset is used to indicate a location of a resource element RE to which the CRS is mapped in a frequency domain resource.

Optionally, the transceiver unit 610 is specifically configured to send indexes of N first PQIs corresponding to the N groups of CRSs to the terminal device, and each first PQI includes information about a quantity of antenna ports and a frequency offset for sending one CRS.

Optionally, the transceiver unit 610 is specifically configured to send indexes of S second PQIs corresponding to the N groups of CRSs to the terminal device, and each second PQI includes information about a quantity of antenna ports and a frequency offset of at least one group of CRSs, where $S \in [1, N)$, and S is a natural number.

Optionally, the first indication information is an index of one second PQI corresponding to the N groups of CRSs, and the second PQI includes information about the quantities of antenna ports and the frequency offsets of the N groups of CRSs.

Optionally, the index of the second PQI is used to indicate a physical downlink shared channel resource element mapping and quasi-co-location configuration PDSCH-RE-mapping-QCL-Config parameter set currently used by the terminal device for data transmission.

Optionally, the PDSCH-RE-mapping-QCL-Config parameter set is carried in radio resource control RRC signaling.

Optionally, the second PQI is a higher layer parameter.

Optionally, the transceiver unit 610 is specifically configured to send N indexes of quantities of CRS antenna ports corresponding to the N groups of CRSs and N indexes of CRS frequency offsets corresponding to the N groups of CRSs to the terminal device.

Optionally, the transceiver unit 610 is specifically configured to send N indexes of quantities of CRS antenna ports and frequency offsets that are corresponding to the N groups of CRSs to the terminal device.

Optionally, the transceiver unit 610 is specifically configured to send an index of configuration information to the terminal device, and the configuration information includes an index of a quantity of antenna ports and a frequency offset of each of the N groups of CRSs.

Optionally, the transceiver unit 610 is specifically configured to send an index of a cell identifier of at least one cell and information about a quantity of antenna ports of the at least one cell to the terminal device, the cell identifier is used to determine a CRS frequency offset, and the CRS frequency offset indicates a location of an RE to which the CRS is mapped in a frequency domain resource.

Optionally, the transceiver unit 610 is specifically configured to send at least one index corresponding to CRS antenna port configuration information of at least one cell to the terminal device, and the CRS antenna port configuration information includes a cell identifier and a corresponding quantity of CRS antenna ports, or a quantity of CRS antenna ports of the cell and a CRS frequency offset of the cell, or a cell identifier, a corresponding quantity of CRS antenna ports, and a corresponding CRS frequency offset.

Optionally, the transceiver unit 610 is specifically configured to send downlink control information DCI to the terminal device, where the DCI includes the indication information.

Optionally, a part of the resources that are occupied by the N groups of cell-specific reference signals CRSs is corresponding to a resource occupied by a CRS corresponding to one codeword.

The network device 600 in this embodiment of this application may be corresponding to the first network device in the data transmission method of the embodiment of this application, and the modules in the network device 600 and the foregoing other operations and/or functions are respectively used to implement corresponding procedures of the method in FIG. 4. For brevity, details are not described herein again.

Therefore, in this embodiment of this application, the network device sends the indication information to the terminal device, so that the terminal device determines, based on the indication information, the resources that are occupied by the N groups of CRSs, and may consider CRS resources of all network devices when receiving data, to correctly receive data, and improve receiving performance.

Figure 7:
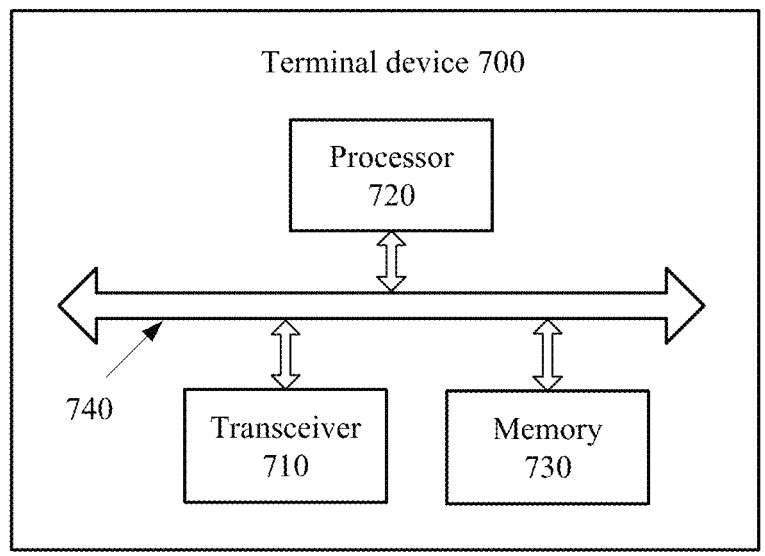
FIG. 7 is another schematic block diagram of a terminal device according to an embodiment of this application.

FIG. 7 is another schematic block diagram of a terminal device 700 according to an embodiment of this application. As shown in FIG. 7, the terminal device 700 includes a transceiver 710, a processor 720, a memory 730, and a bus system 740, where the transceiver 710, the processor 720, and the memory 730 are connected to each other by using the bus system 740, the memory 730 is configured to store an instruction, and the processor 720 is configured to execute the instruction that is stored in the memory 730, to control the transceiver 710 to receive and send a signal.

The transceiver unit 510 in the terminal device 500 shown in FIG. 5 may be corresponding to the transceiver 710, and the determining unit 520 in the terminal device 500 shown in FIG. 5 may be corresponding to the processor 720.

Figure 8:
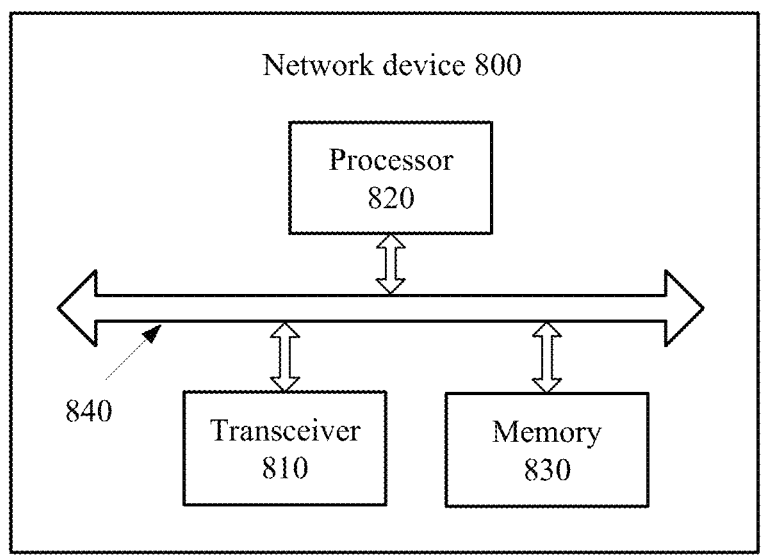
FIG. 8 is another schematic block diagram of a network device according to an embodiment of this application.

FIG. 8 is another schematic block diagram of a network device 800 according to an embodiment of this application. As shown in FIG. 8, the network device 800 includes a transceiver 810, a processor 820, a memory 830, and a bus system 840, where the transceiver 810, the processor 820, and the memory 830 are connected to each other by using the bus system 740, the memory 830 is configured to store an instruction, and the processor 820 is configured to execute the instruction that is stored in the memory 830, to control the transceiver 810 to receive and send a signal.

The transceiver unit 610 in the network device 600 shown in FIG. 6 may be corresponding to the transceiver 810, and the determining unit 620 in the network device 600 shown in FIG. 6 may be corresponding to the processor 820.

According to the method provided in the embodiments of this application, an embodiment of this application further provides a communications system, which includes the foregoing network device and one or more terminal devices.

It should be noted that the foregoing method embodiment of this application may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through examples but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (Synchlink DRAM, SLDRAM), and a direct rambus dynamic random access memory (DR RAM). It should be noted that the memory of the systems and methods described in this specification includes but is not limited to these and any memory of another proper type.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method comprising:
   receiving, by a terminal device, indication information from a network device for indicating quantities of antenna ports and frequency offsets of N groups of cell specific reference signals (CRSs), N being a natural number greater than or equal to 2, a frequency offset indicating a location of a resource element (RE) to which a CRS is mapped in a frequency domain resource; and
   determining, by the terminal device based on the indication information, resources that are occupied by the N groups of CRSs, and receiving data based on the resources that are occupied by the N groups of CRSs,
   wherein the indication information is an index of one physical resource element mapping and quasi-co-location indicator (PQI) corresponding to the N groups of CRSs, the PQI including information about the quantities of antenna ports and frequency offsets of the N groups of CRSs.

2. The method according to claim 1, wherein the PQI is used to indicate a physical downlink shared channel resource element mapping and quasi-co-location configuration (PDSCH-RE-mapping-QCL-Config) parameter set currently used by the terminal device for data transmission.

3. The method according to claim 2, wherein the PDSCH-RE-mapping-QCL-Config parameter set is carried in radio resource control RRC signaling.

4. The method according to claim 1, wherein receiving, by the terminal device, indication information comprises receiving, by the terminal device, downlink control information (DCI) from the network device, and wherein the DCI comprises the indication information.

5. The method according to claim 1, wherein a part of the resources that are occupied by the N groups of CRSs is corresponding to a resource occupied by a CRS corresponding to one codeword.

6. A data transmission method comprising:
   determining, by a network device, quantities of antenna ports and frequency offsets for sending N groups of cell-specific reference signals (CRSs) for enabling a terminal device to receive data, wherein N is a natural number greater than or equal to 2; and
   sending, by the network device, indication information to the terminal device for indicating the quantities of antenna ports and frequency offsets of the N groups of CRSs, a frequency offset indicating a location of a resource element (RE) to which a CRS is mapped in a frequency domain resource,
   wherein the indication information is an index of one physical resource element mapping and quasi-co-location indicator (PQI) corresponding to the N groups of CRSs, the PQI including information about the quantities of antenna ports and the frequency offsets of the N groups of CRSs.

7. The method according to claim 6, wherein the PQI is used to indicate a physical downlink shared channel resource element mapping and quasi-co-location configuration (PDSCH-RE-mapping-QCL-Config) parameter set currently used by the terminal device for data transmission.

8. The method according to claim 7, wherein the PDSCH-RE-mapping-QCL-Config parameter set is carried in radio resource control RRC signaling.

9. The method according to claim 6, wherein sending, by the network device, indication information comprises sending, by the network device, downlink control information (DCI) to the terminal device, and wherein the DCI comprises the indication information.

10. The method according to claim 6, wherein a part of the resources that are occupied by the N groups of cell-specific reference signals CRSs is corresponding to a resource occupied by a CRS corresponding to one codeword.

11. A terminal device comprising:
    a processor; and
    memory coupled to the processor, the memory comprising instructions that, when executed by the processor, cause the terminal device to:
    receive indication information from a network device for indicating quantities of antenna ports and frequency offsets of N groups of cell-specific reference signals (CRSs), N being a natural number greater than or equal to 2, and a frequency offset indicating a location of a resource element (RE) to which a CRS is mapped in a frequency domain resource; and
    determine, based on the indication information, resources that are occupied by the N groups of CRSs, and receiving data based on the resources that are occupied by the N groups of CRSs, wherein the indication information is an index of one physical resource element mapping and quasi-co-location indicator (PQI) corresponding to the N groups of CRSs, the PQI including information about the quantities of antenna ports and frequency offsets of the N groups of CRSs.

12. The terminal device according to claim 11, wherein the index of the PQI is used to indicate a physical downlink shared channel resource element mapping and quasi-co-location configuration (PDSCH-RE-mapping-QCL-Config) parameter set currently used by the terminal device for data transmission.

13. The terminal device according to claim 12, wherein the PDSCH-RE-mapping-QCL-Config parameter set is carried in radio resource control (RRC) signaling.

14. The terminal device according to claim 11, wherein when executed by the processor, cause the terminal device to receive downlink control information (DCI) from the network device, and wherein the DCI comprises the indication information.

15. The terminal device according to claim 11, wherein a part of the resources that are occupied by the N groups of CRSs is corresponding to a resource occupied by a CRS corresponding to one codeword.

* * * * *